US010432833B2

(12) United States Patent
Moriyama et al.

(10) Patent No.: US 10,432,833 B2
(45) Date of Patent: Oct. 1, 2019

(54) INTERCHANGEABLE LENS CAMERA

(71) Applicant: SONY CORPORATION, Tokyo (JP)

(72) Inventors: Satoshi Moriyama, Kanagawa (JP); Seiichi Tanaka, Saitama (JP); Kenji Himeno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 15/108,616

(22) PCT Filed: Nov. 28, 2014

(86) PCT No.: PCT/JP2014/081522
§ 371 (c)(1),
(2) Date: Jun. 28, 2016

(87) PCT Pub. No.: WO2015/114934
PCT Pub. Date: Aug. 6, 2015

(65) Prior Publication Data
US 2016/0330354 A1    Nov. 10, 2016

(30) Foreign Application Priority Data

Jan. 30, 2014   (JP) .................. 2014-015450

(51) Int. Cl.
*H04N 5/225*    (2006.01)
*G03B 17/56*    (2006.01)
*H04N 5/232*    (2006.01)
*G03B 17/14*    (2006.01)

(52) U.S. Cl.
CPC .......... *H04N 5/2254* (2013.01); *G03B 17/14* (2013.01); *G03B 17/566* (2013.01); *H04N 5/23209* (2013.01)

(58) Field of Classification Search
CPC ............... H04N 5/2254; H04N 5/2253; H04N 5/23209; H04N 5/22541; G03B 17/12; G03B 17/14; G03B 17/566
USPC .......... 348/373–376; 396/419–428, 544–545
See application file for complete search history.

(56) References Cited

U.S. PATENT DOCUMENTS 5,065,175 A * 11/1991 Suzuki .................... G02B 7/36
                                                    359/827
5,734,935 A *  3/1998 Imanari ................. G03B 17/14
                                                    396/529
6,336,754 B1*  1/2002 Sato ......................... G03B 7/20
                                                    396/529

(Continued)

FOREIGN PATENT DOCUMENTS

JP    11-249217 A    9/1999
JP    2008-118199 A  5/2008
JP    2010-160176 A  7/2010

OTHER PUBLICATIONS

International Search report on patentability received for PCT Application No. PCT/JP2014/081522, dated Mar. 10, 2015, pp. 1.

(Continued)

*Primary Examiner* — Twyler L Haskins
*Assistant Examiner* — Akshay Trehan
(74) *Attorney, Agent, or Firm* — Chip Law Group

(57) ABSTRACT

There is provided a camera that includes a body and two or more kinds of groups of contacts provided on the body. The two or more kinds of groups of contacts are configured to be coupled to respective two or more kinds of lenses that include different lens-side mounts.

16 Claims, 23 Drawing Sheets

(56) References Cited

U.S. PATENT DOCUMENTS

| | | | | |
|---|---|---|---|---|
| 2007/0047953 | A1* | 3/2007 | Kawai | G03B 17/14 396/544 |
| 2009/0269049 | A1* | 10/2009 | Ueda | G03B 17/14 396/529 |
| 2010/0091175 | A1* | 4/2010 | Shintani | G02B 7/365 348/345 |
| 2010/0165188 | A1* | 7/2010 | Jannard | H04N 5/2252 348/375 |
| 2011/0103789 | A1* | 5/2011 | Honjo | G02B 7/102 396/530 |
| 2012/0063016 | A1* | 3/2012 | Imafuji | G03B 17/14 359/822 |
| 2012/0121248 | A1* | 5/2012 | Shirono | G03B 11/00 396/544 |
| 2012/0219281 | A1* | 8/2012 | Imafuji | G02B 7/08 396/529 |
| 2013/0071102 | A1* | 3/2013 | Imafuji | G03B 17/14 396/532 |
| 2013/0077953 | A1* | 3/2013 | Kikuchi | G02B 7/102 396/530 |
| 2013/0077954 | A1* | 3/2013 | Oikawa | G03B 17/565 396/530 |
| 2013/0077955 | A1* | 3/2013 | Imafuji | G03B 17/56 396/532 |
| 2014/0002676 | A1* | 1/2014 | Ning | G02B 7/14 348/187 |

OTHER PUBLICATIONS

Written Opinion received for PCT Application No. PCT/JP2014/081522, dated Mar. 10, 2015, p. 4.

* cited by examiner

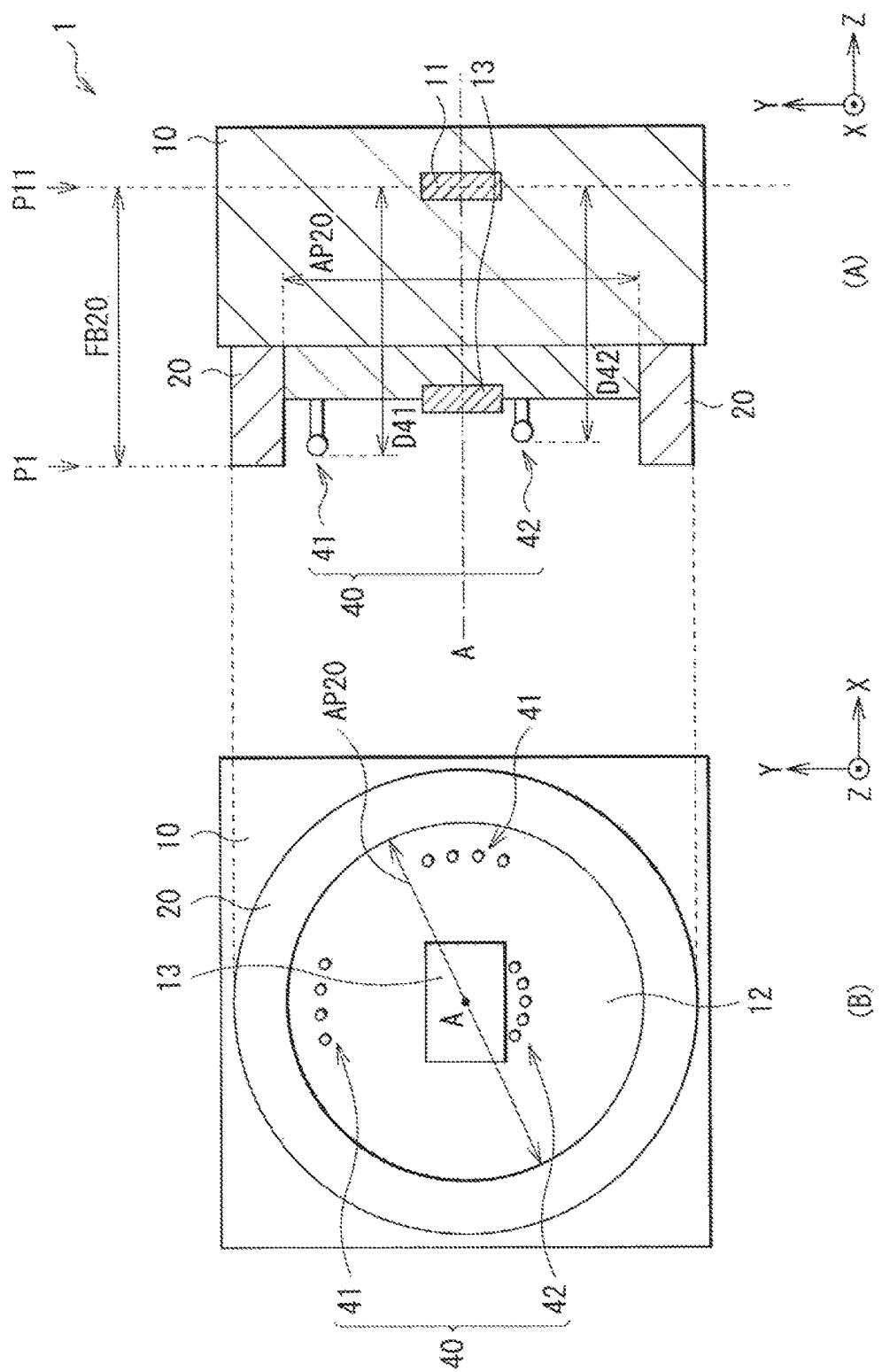
[FIG. 1]

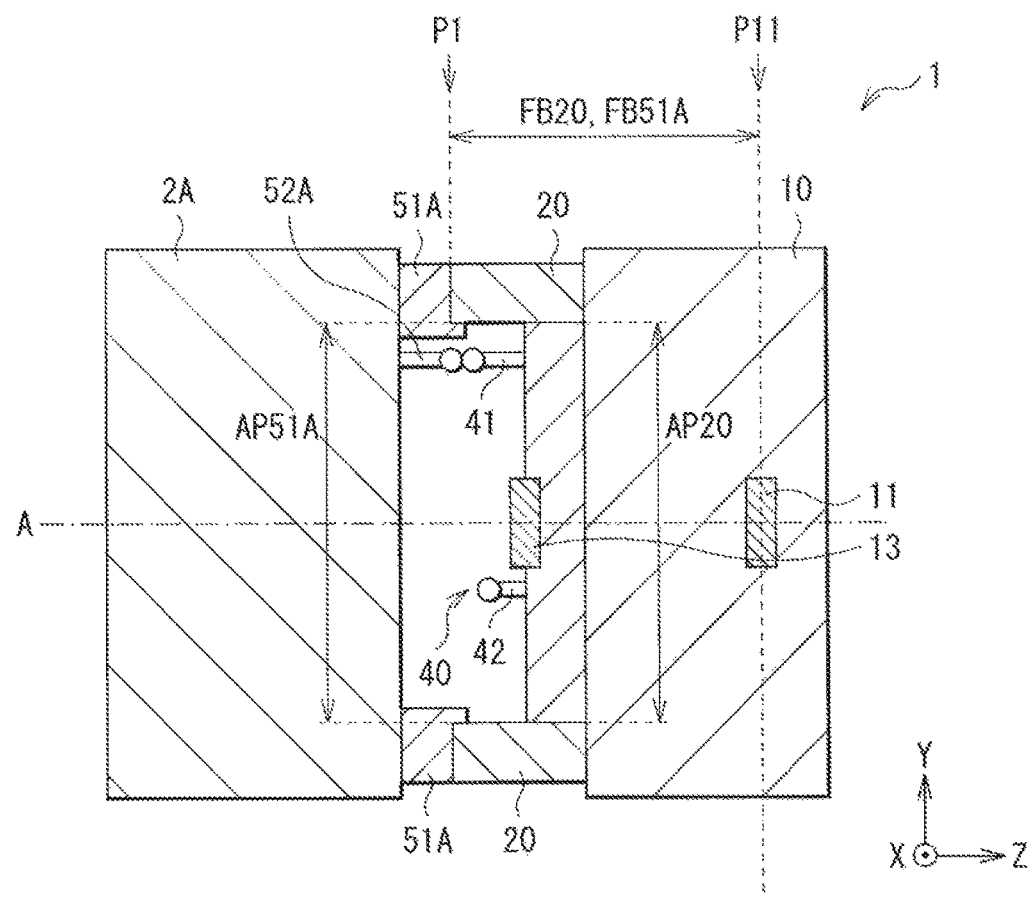
[FIG. 2]

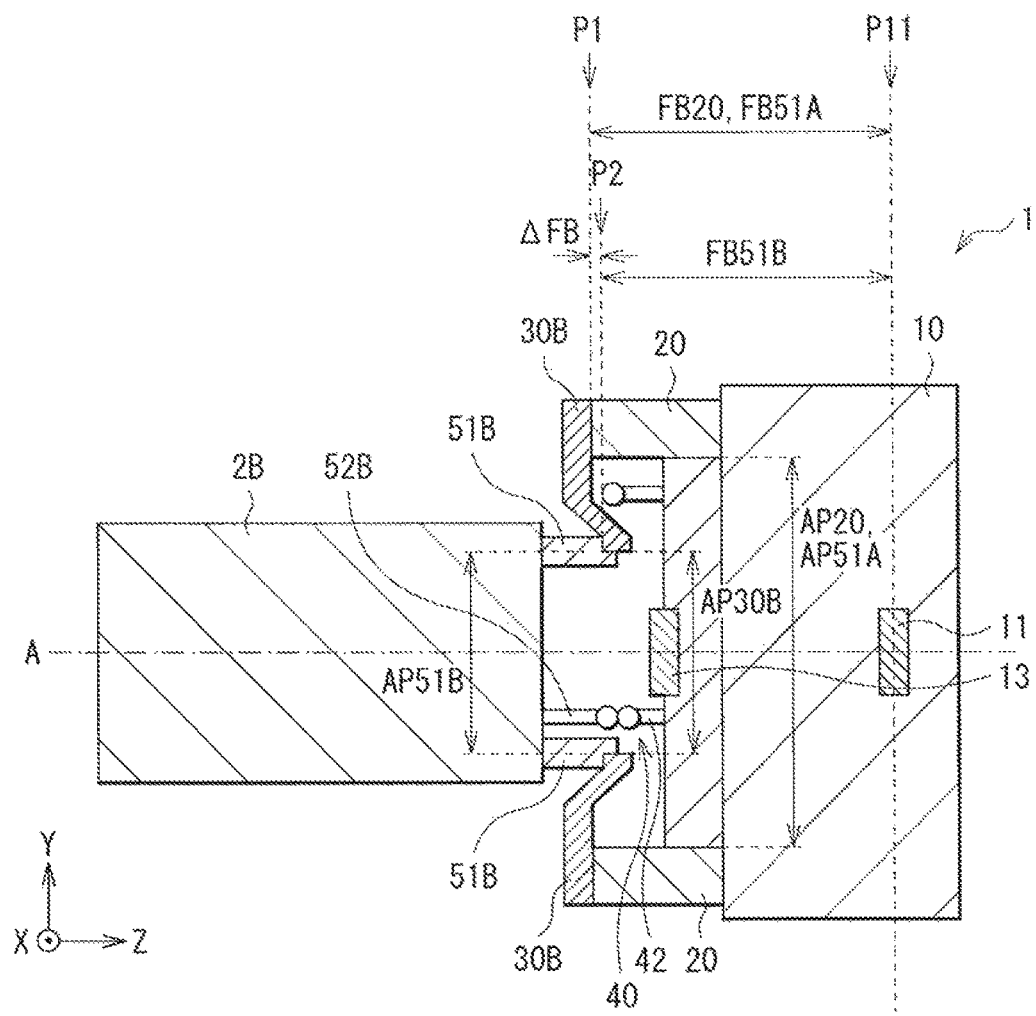
[FIG. 3]

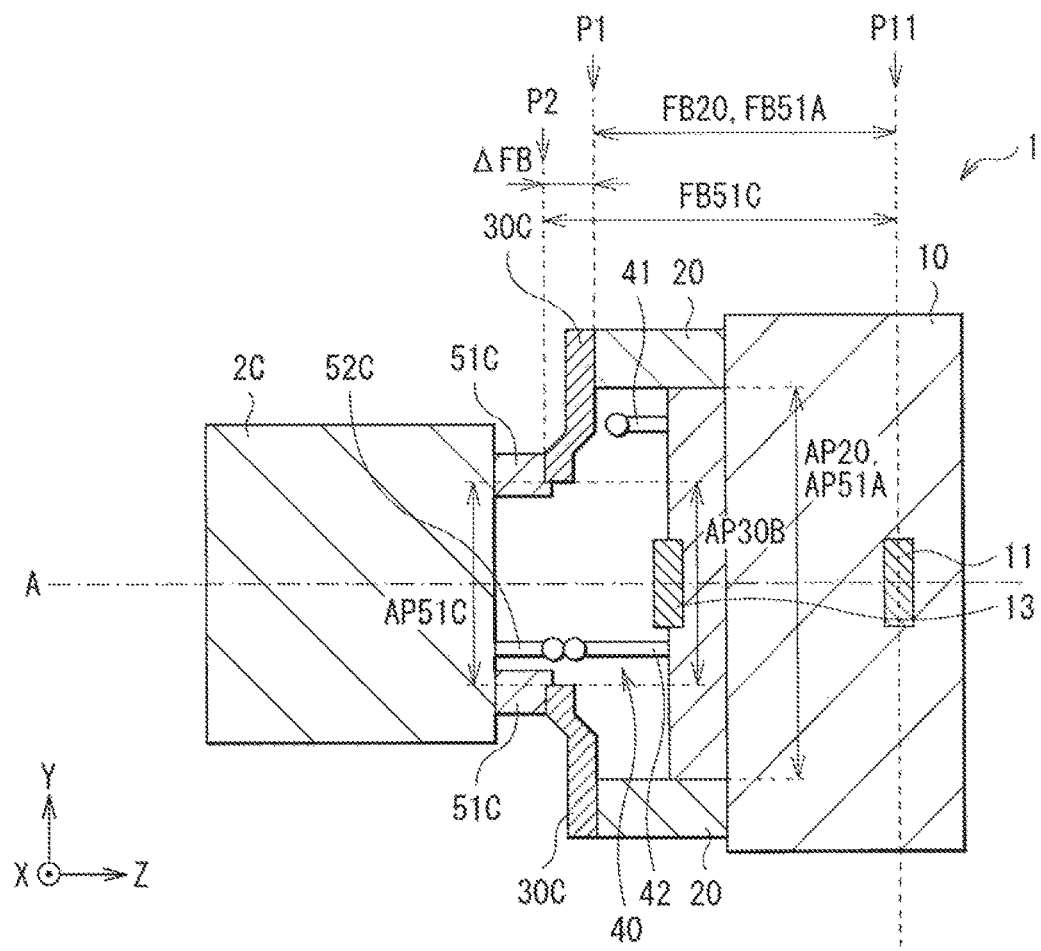
[ FIG. 4 ]

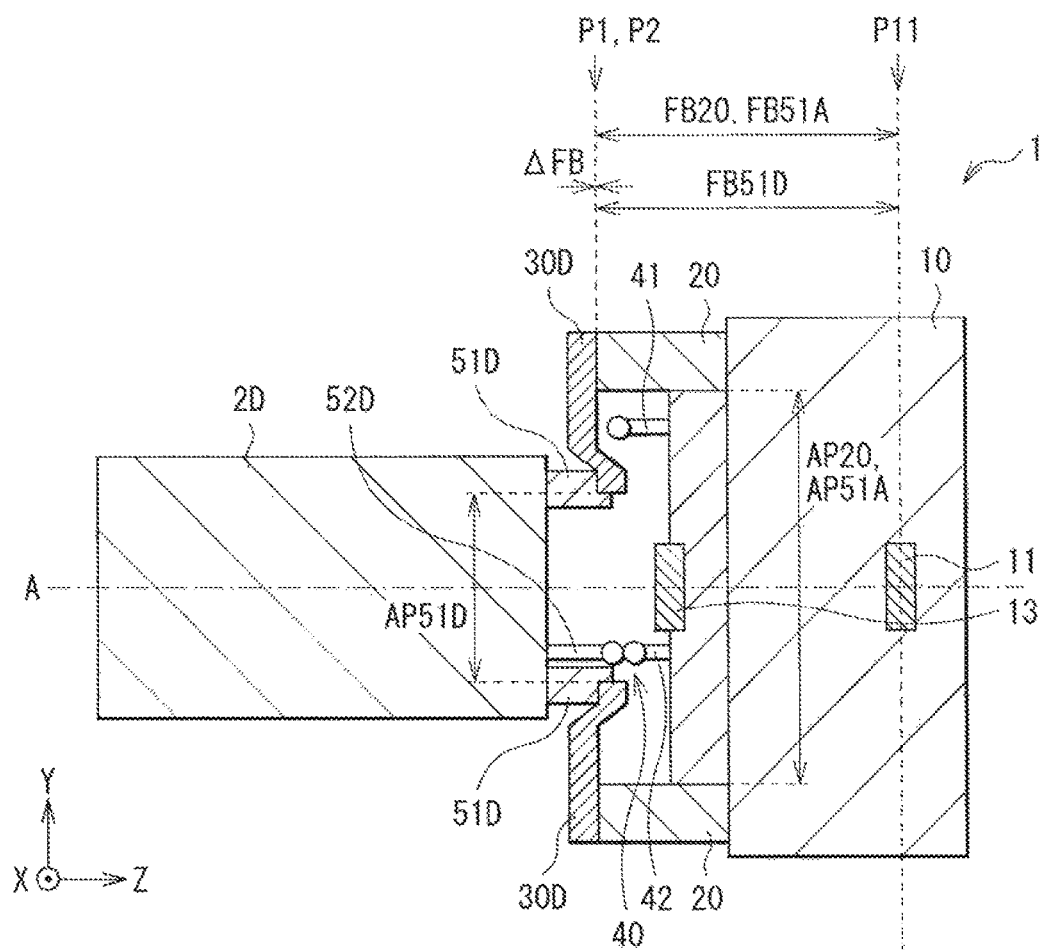
[FIG. 5]

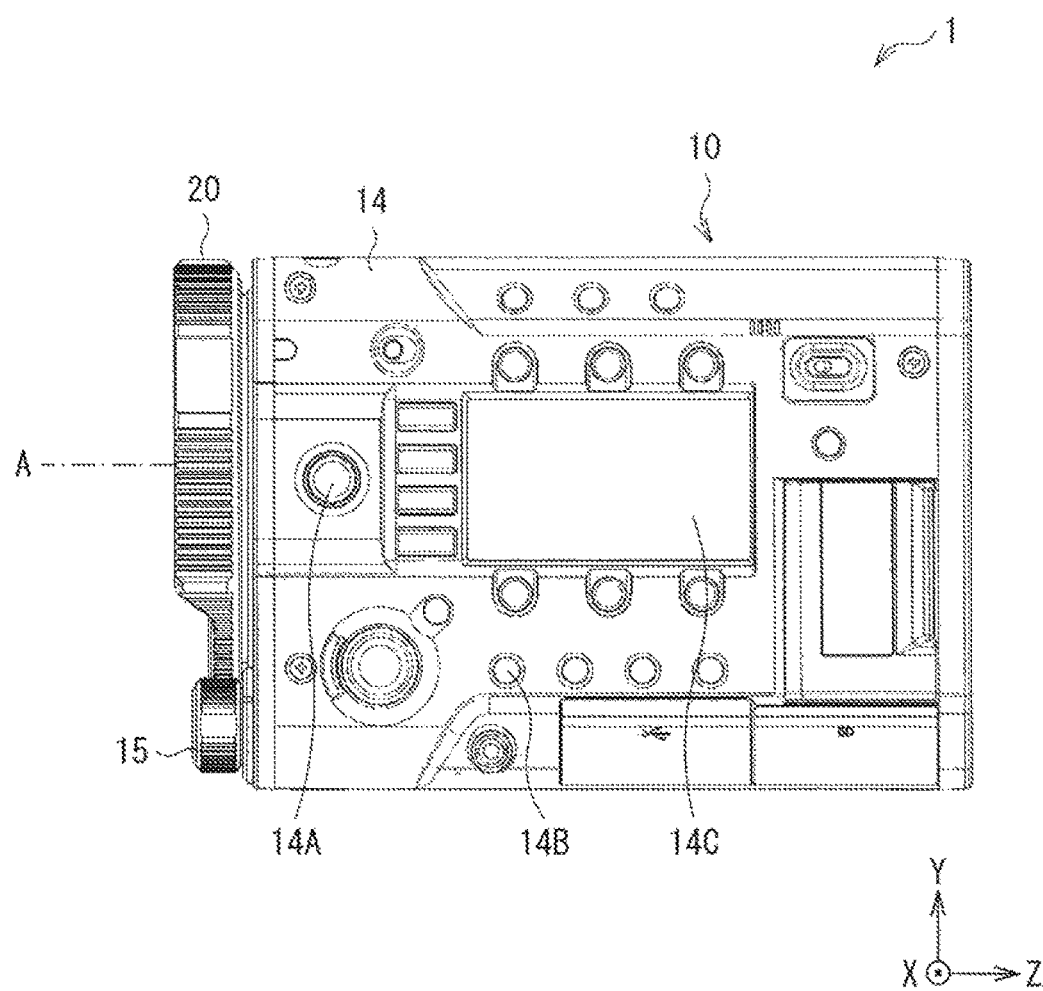

[FIG. 7]
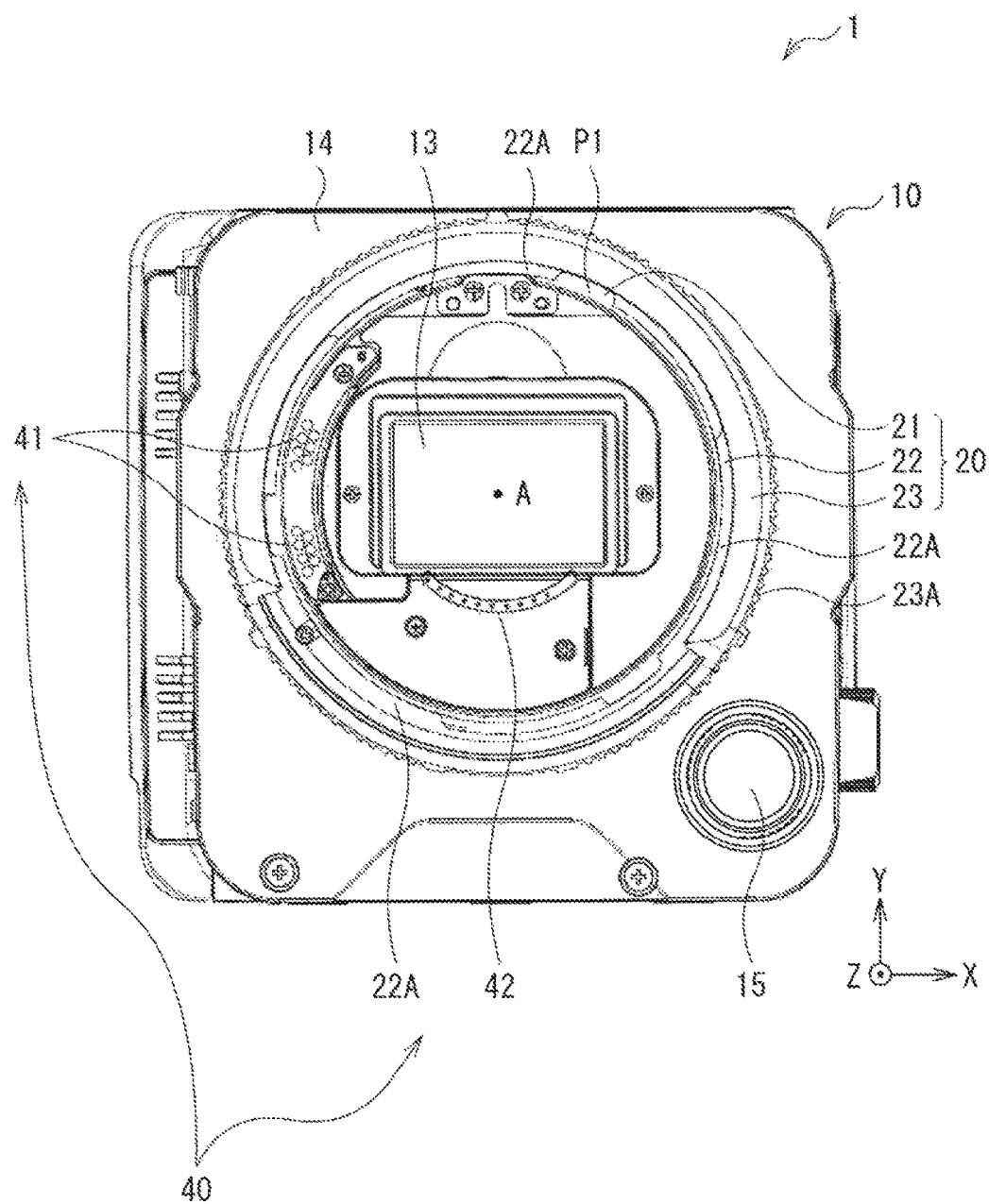

[FIG. 8]
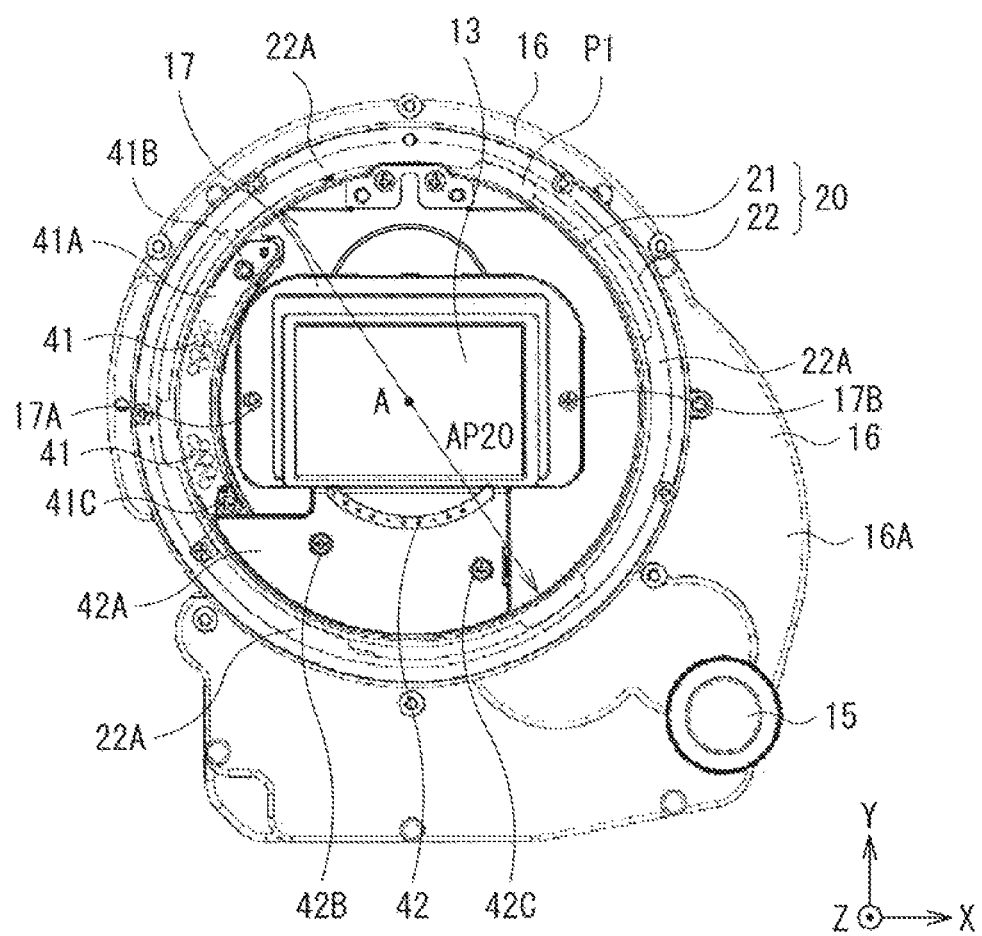

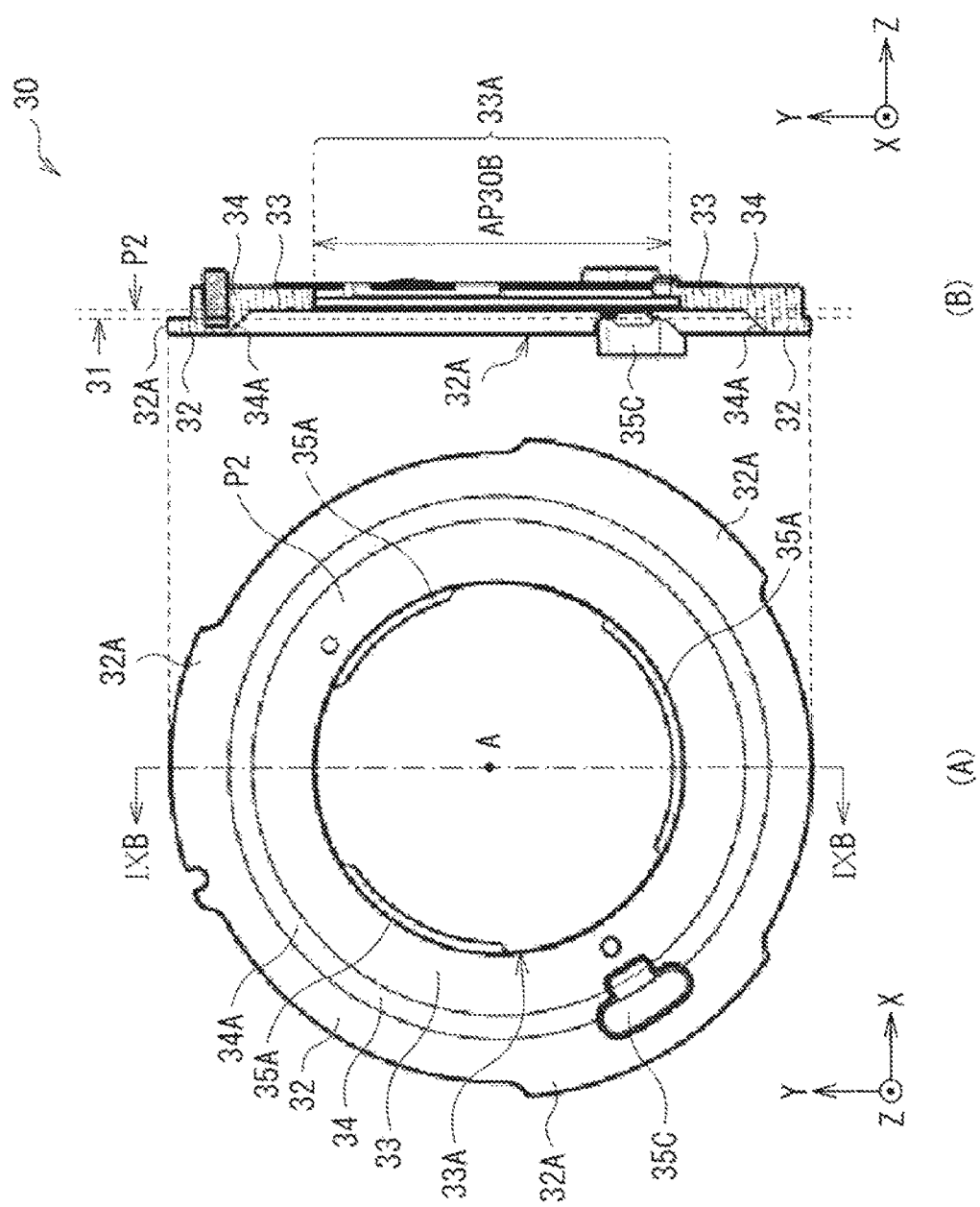
[FIG. 9]

[ FIG. 10 ]
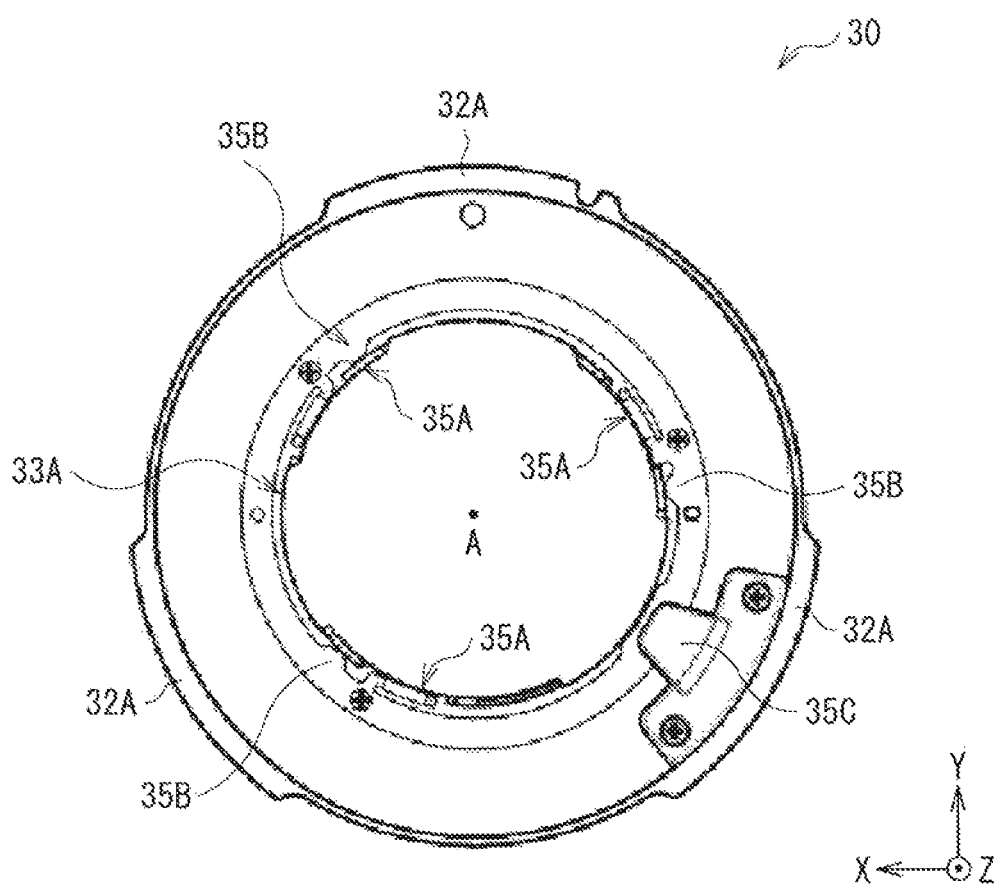

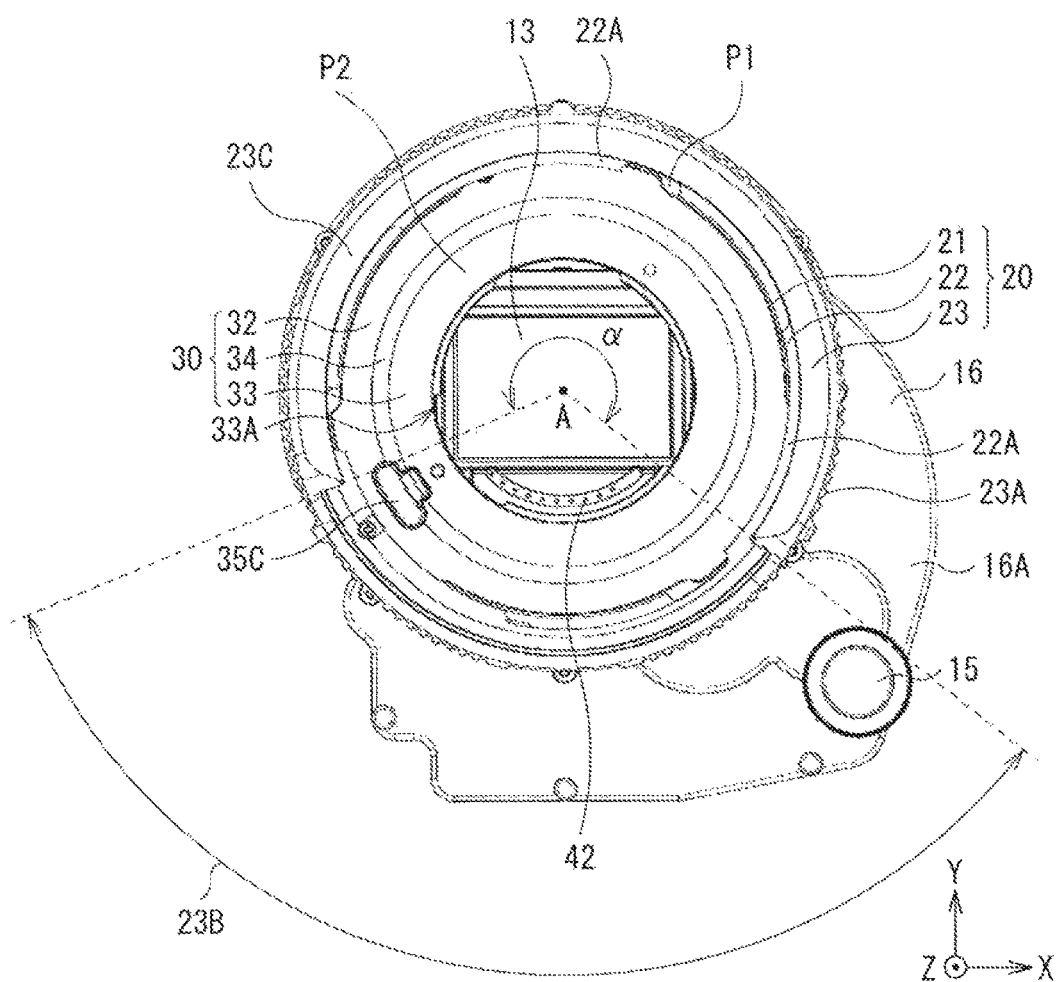
[FIG. 11]

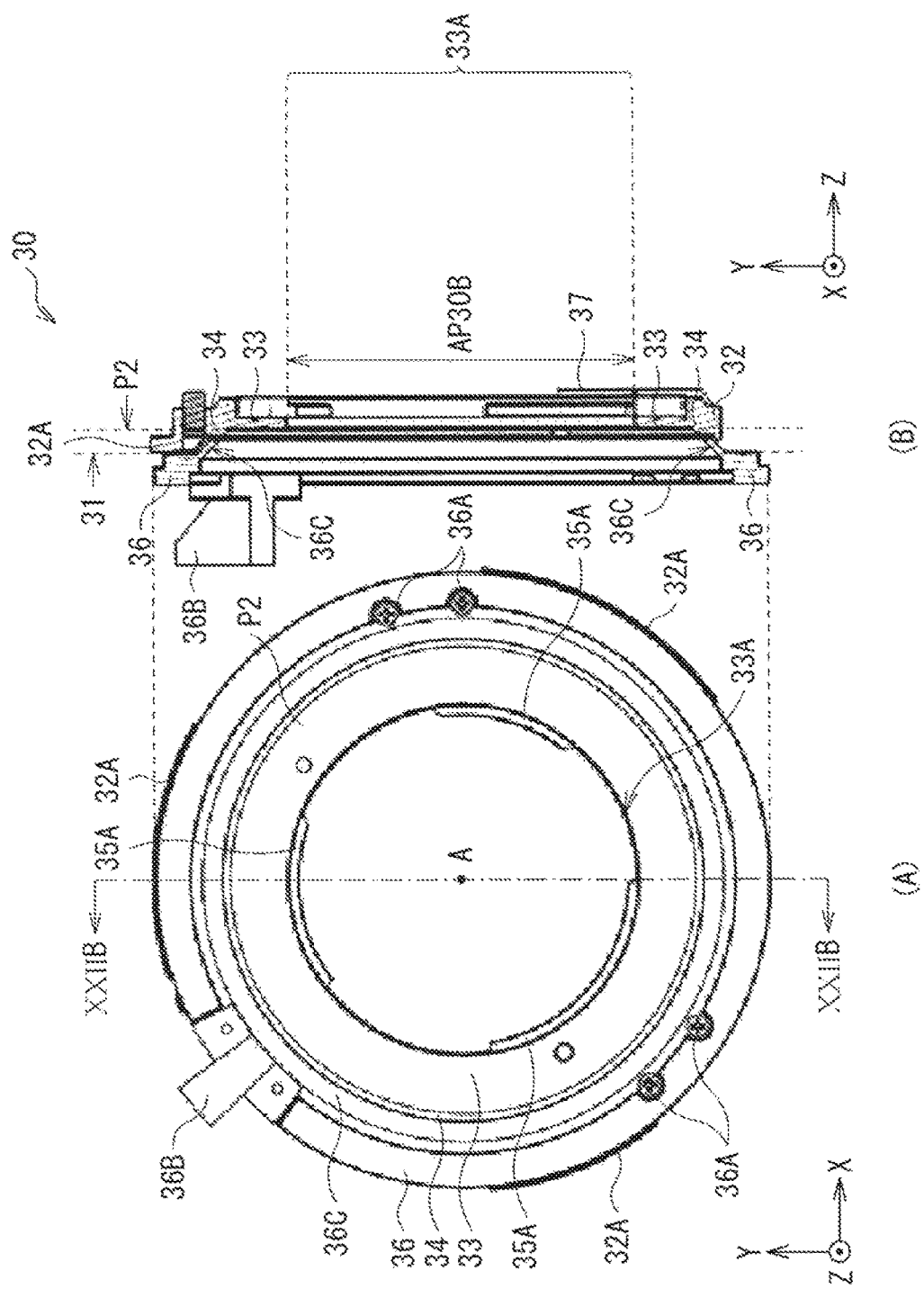
[FIG. 12]

[ FIG. 13 ]
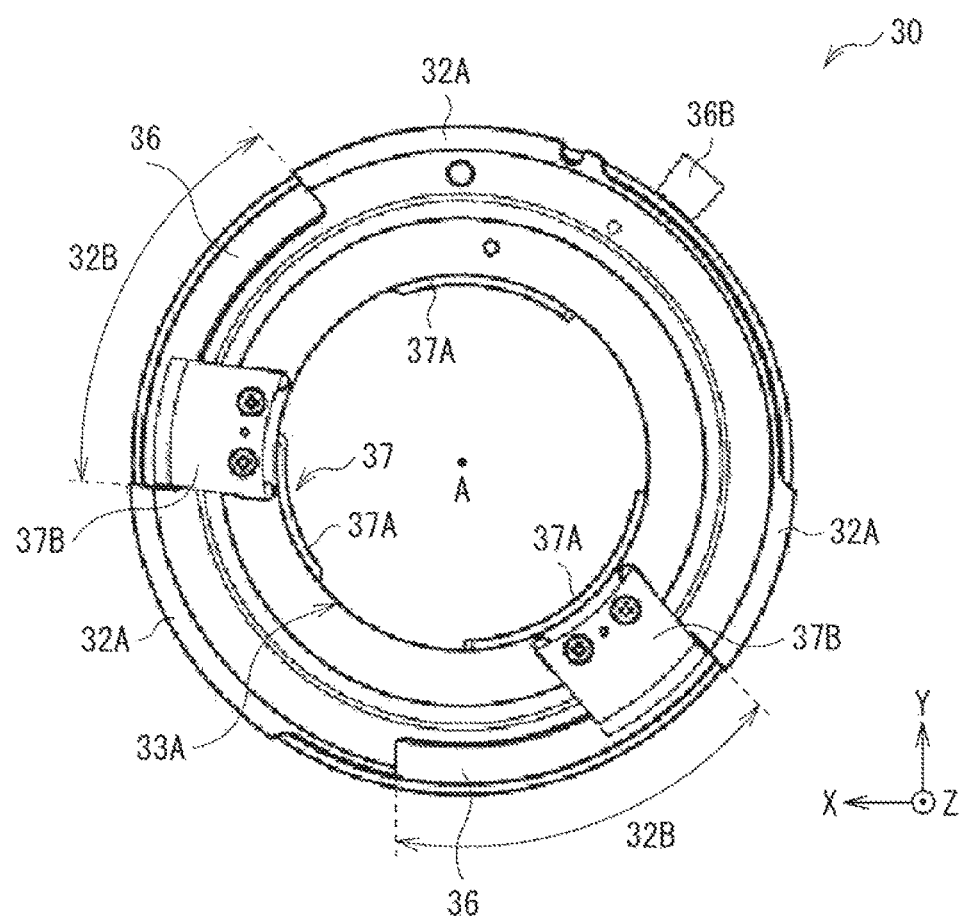

[FIG. 14]
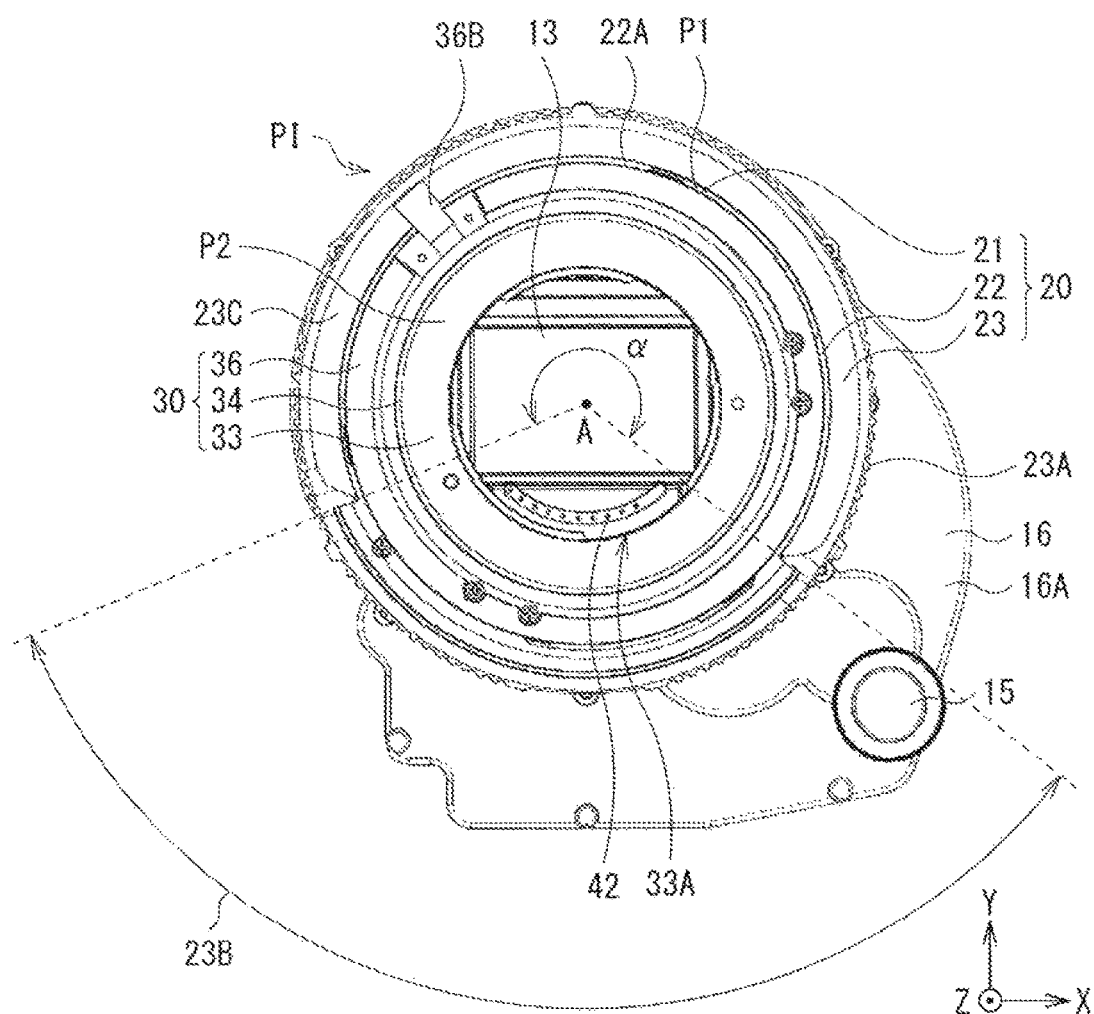

[FIG. 15]
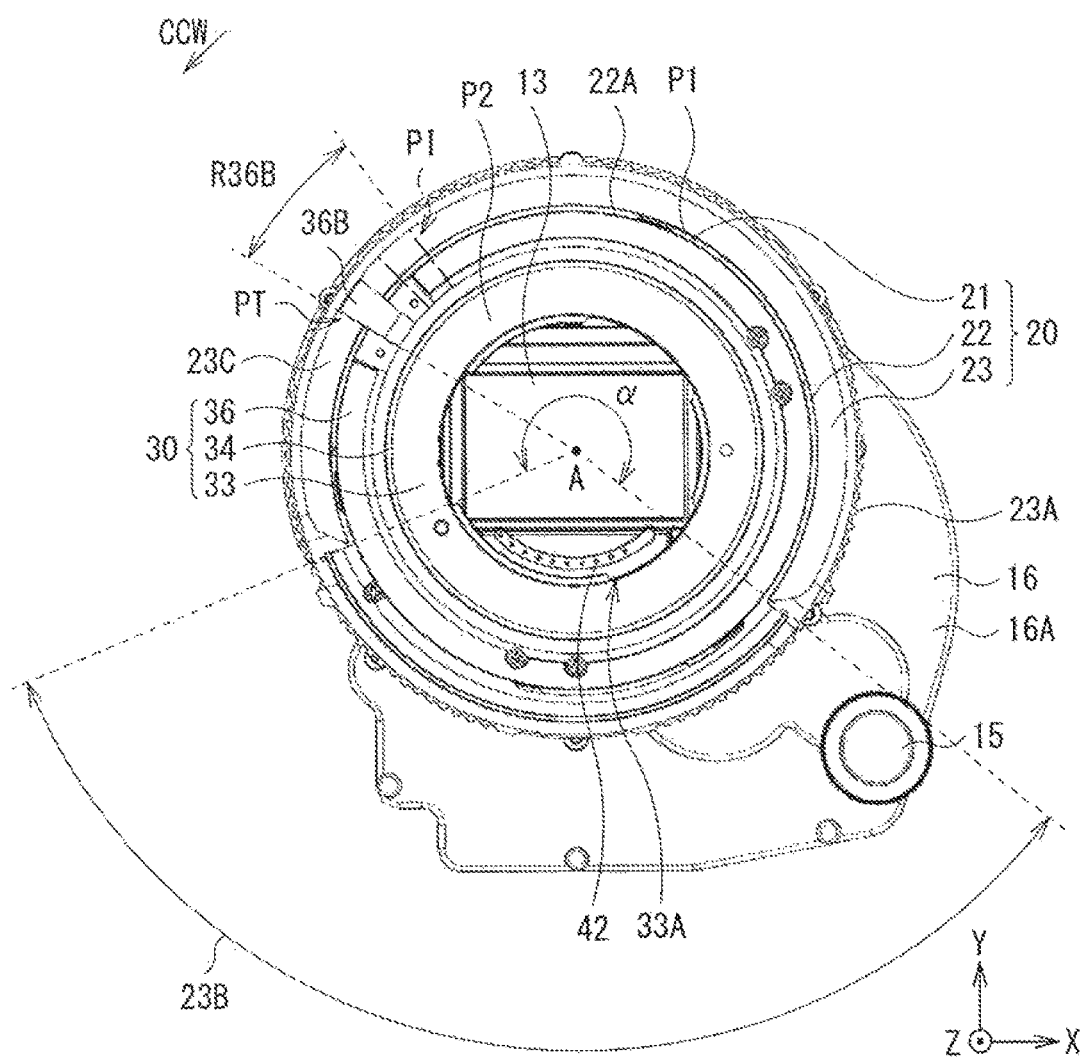

[FIG. 16]
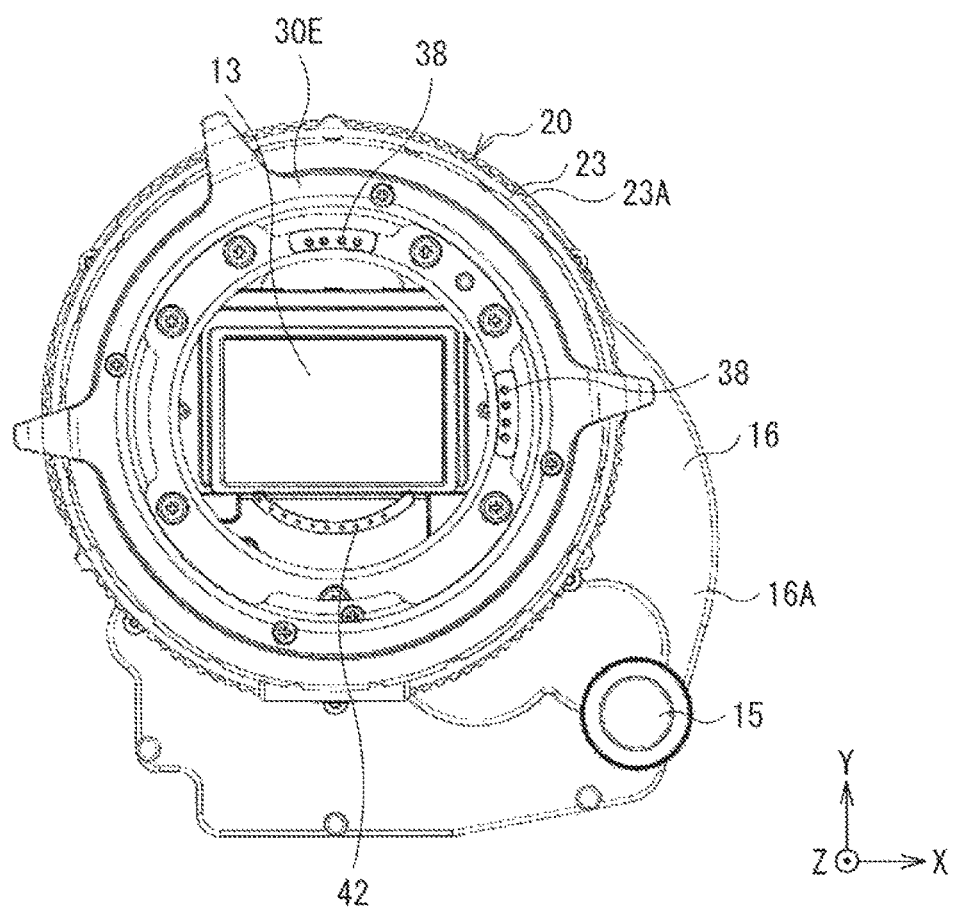

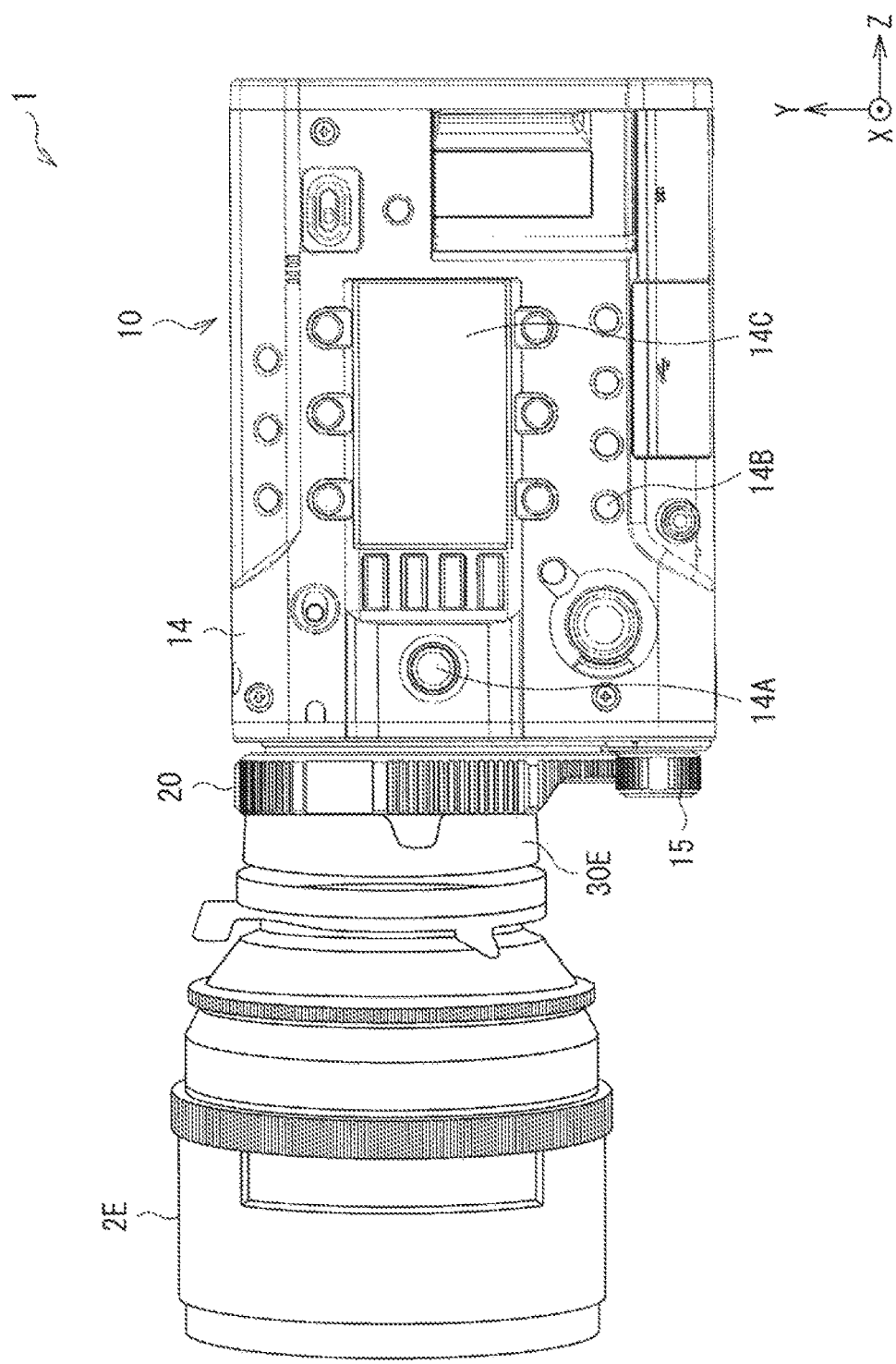
[FIG. 17]

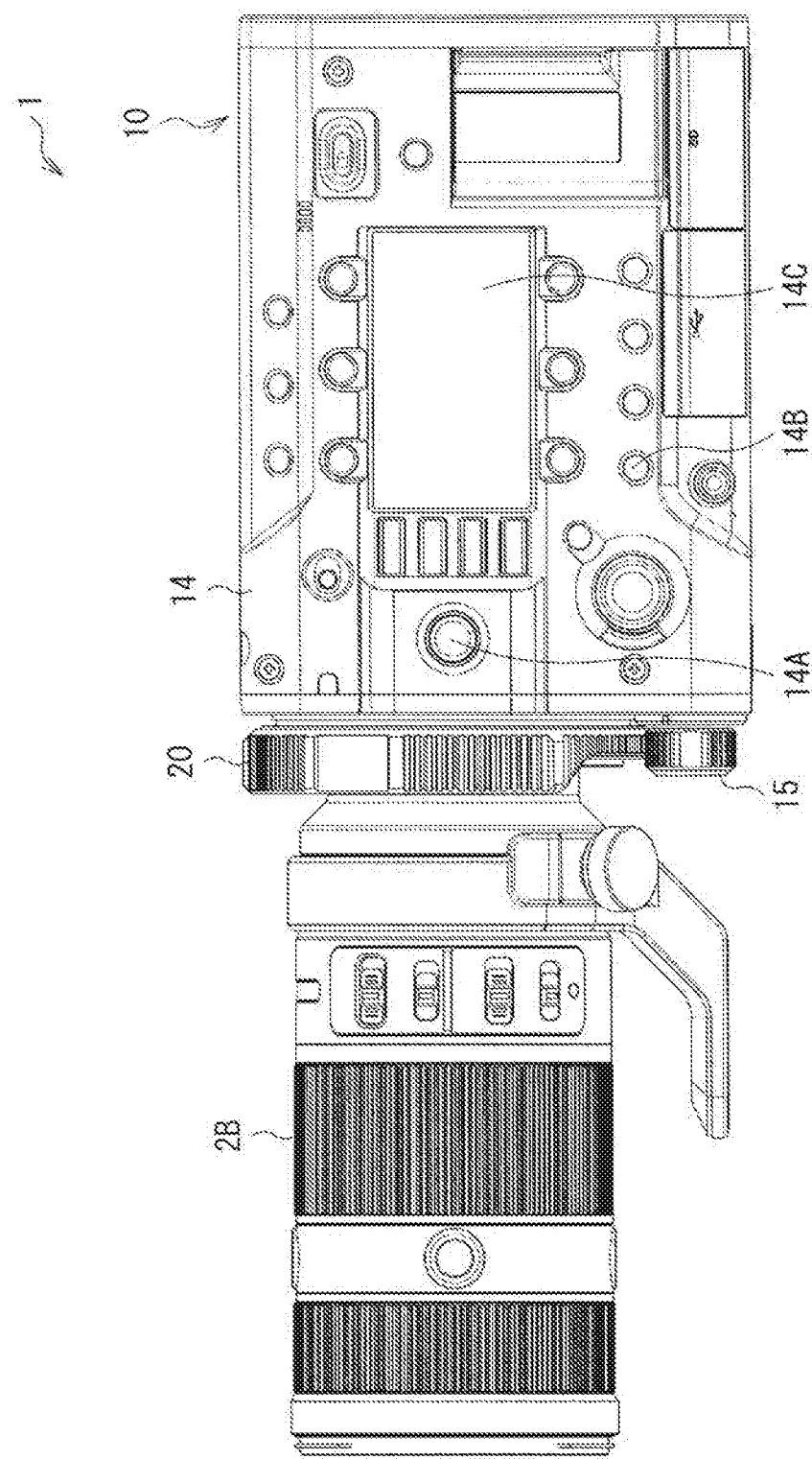
[ FIG. 18 ]

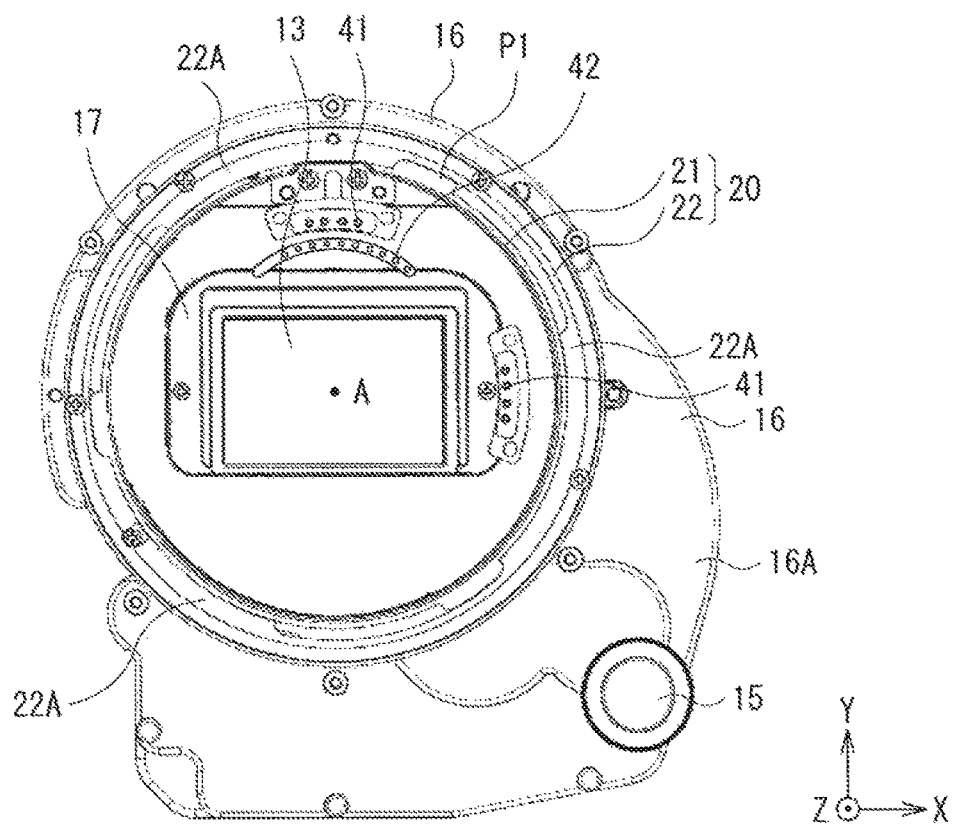
[FIG. 19]

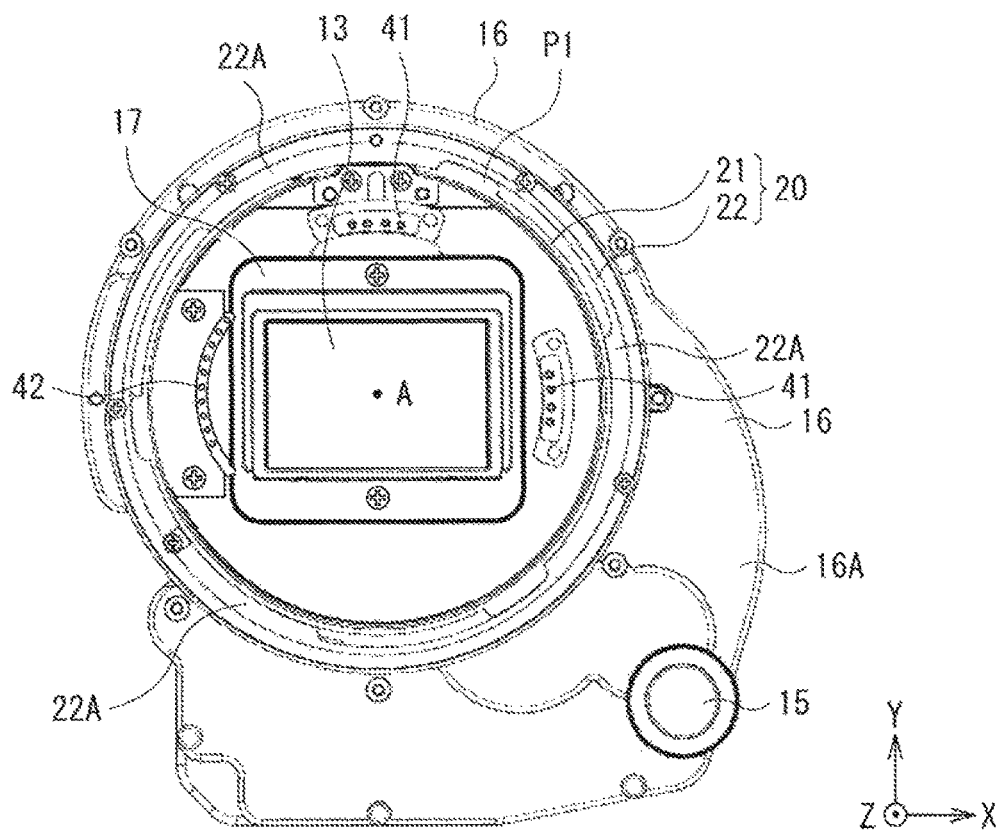
[ FIG. 20 ]

[ FIG. 21 ]
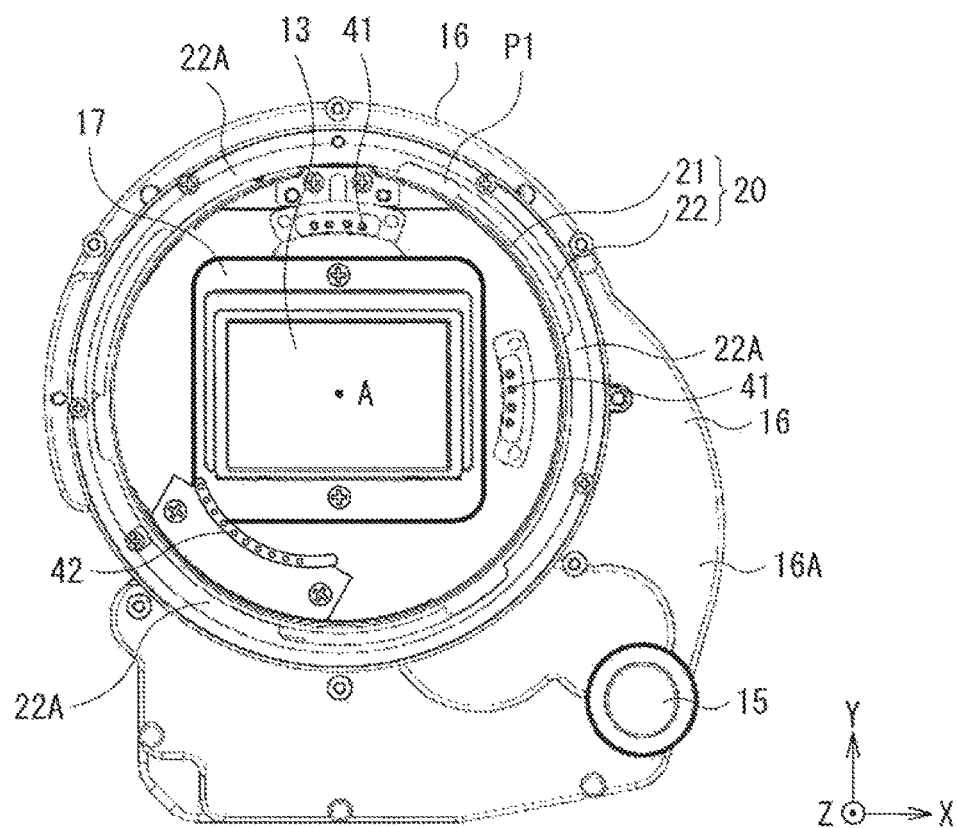

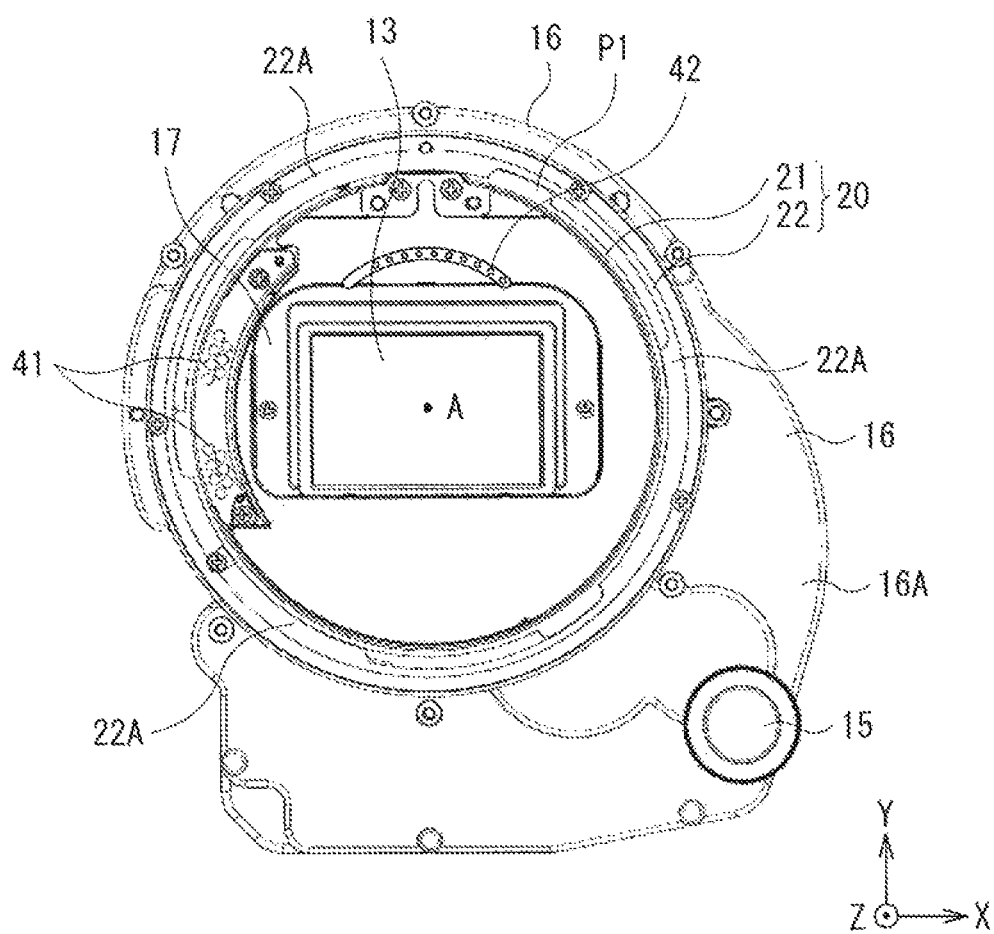
[FIG. 22]

[ FIG. 23 ]
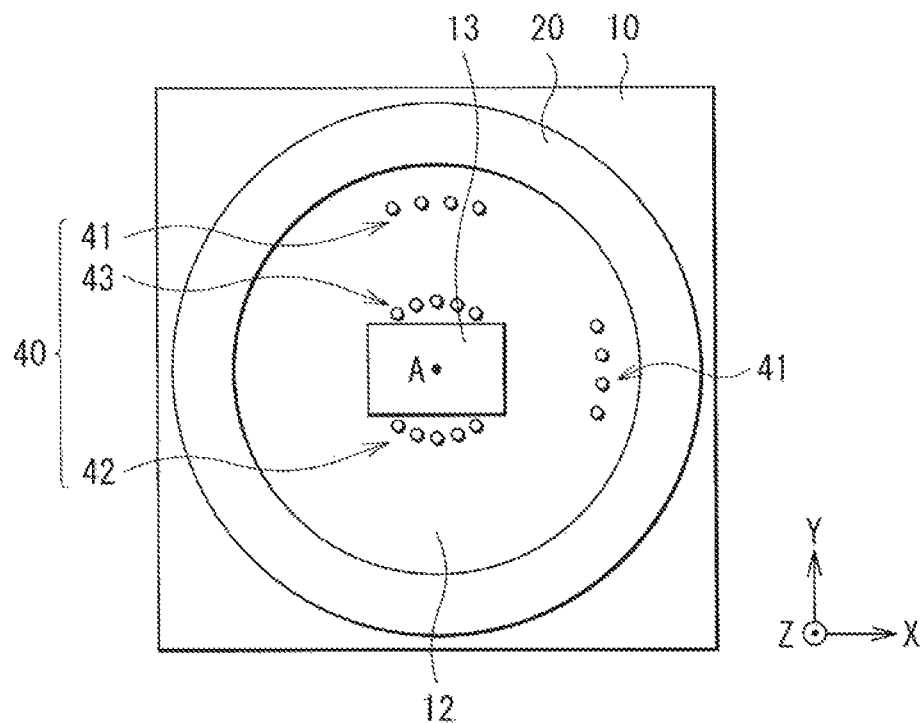
[ FIG. 24 ]
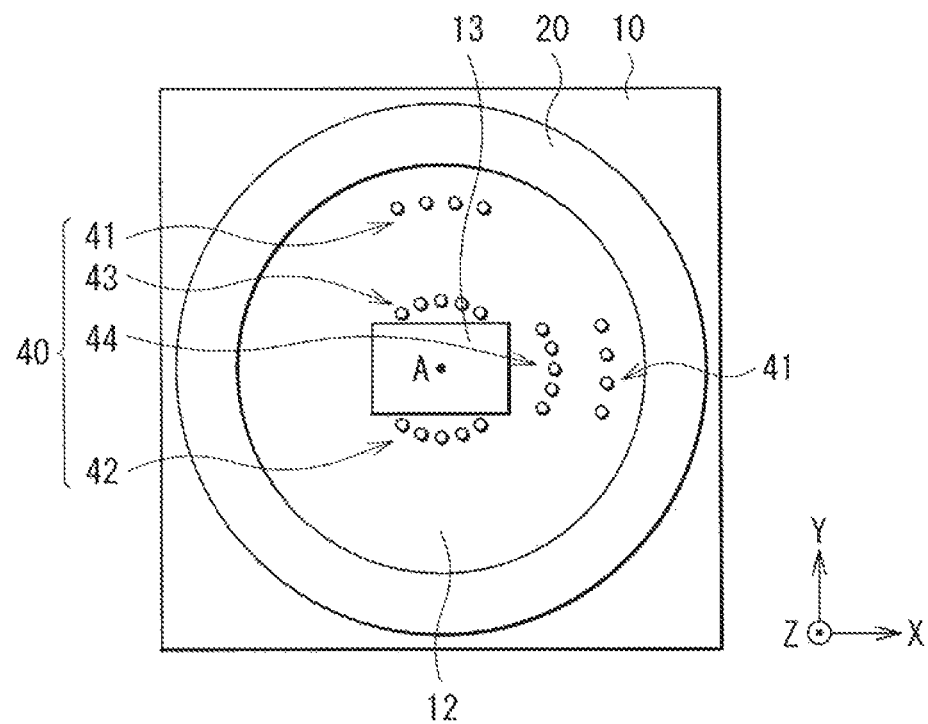

INTERCHANGEABLE LENS CAMERA

CROSS REFERENCE TO RELATED APPLICATIONS

This application is a U.S. National Phase of International Patent Application No. PCT/JP2014/081522 filed on Nov. 28, 2014, which claims priority benefit of Japanese Patent Application No. JP 2014-015450 filed in the Japan Patent Office on Jan. 30, 2014. Each of the above-referenced applications is hereby incorporated herein by reference in its entirety.

TECHNICAL FIELD

The disclosure relates to an interchangeable lens camera and an adapter for use with the camera.

BACKGROUND ART

In an interchangeable lens camera, a body and a lens are provided with respective apertures, whose coupling allows the lens to be mounted on the body. The apertures of the body and the lens may be respectively called a body-side mount and a lens-side mount. The body-side mount and the lens-side mount each may have an aperture diameter and a flange back distance unique to itself. Basically, a body-side mount of a body may take a lens having a lens-side mount adapted for the body-side mount.

Meanwhile, when it is desired to couple, to the body, a lens that includes a lens-side mount different from the lens-side mount adapted for the body-side mount of the body, the lens may be mounted on the body with an adapter interposed therebetween. The adapter may perform not only conversion of coupling shapes between the body-side mount and the lens-side mount having different aperture diameters, but also conversion of groups of contacts provided for communication between the lens and the body. Accordingly, the adapter may include, for example, a first group of contacts on a rear surface, and a second group of contacts on a front surface. The first group of contacts may make contact with a group of contacts of the body. The second group of contacts may make contact with a group of contacts of the lens. Wirings may be inserted through inside the adapter, in order to electrically couple the first group of contacts to the second group of contacts (for example, refer to Patent Literature 1).

CITATION LIST

Patent Literature

Patent Literature 1: JP 2013-8059A

SUMMARY OF INVENTION

In order to provide the adapter with the groups of contacts and to insert the wirings or other components through inside the adapter, however, it is desirable to increase a thickness of the adapter to a certain degree in a direction of an optical axis. This results in limitation in attaining lower profile of the adapter. In other words, it has been difficult to attain both the lower profile of the adapter and the conversion of the groups of contacts between the lens and the body.

It is therefore desirable to provide a camera that allows for lower profile of an adapter and conversion of groups of contacts between a lens and a body, and an adapter for use with the camera.

A camera according to an embodiment of the disclosure includes a body and two or more kinds of groups of contacts provided on the body. The two or more kinds of groups of contacts are configured to be coupled to respective two or more kinds of lenses that include different lens-side mounts.

Here, the two or more kinds of lenses that include the different lens-side mounts may mean that the two or more kinds of lenses include the lens-side mounts different in shapes with which mechanical fitting into the body is made. In one specific example, the two or more kinds of lenses may include the lens-side mounts different in diameters of apertures where the fitting is made. Alternatively, the two or more kinds of lenses that include the different lens-side mounts may mean that the two or more kinds of lenses include the lens-side mounts different in flange back distances.

Two groups of contacts different in kinds may refer to two groups of contacts configured to be coupled to different lenses. For example, assume that two groups of contacts are disposed apart on a body. When the two groups of contacts are configured to be coupled to different lenses, the two groups of contacts may be counted as two kinds. Meanwhile, when the two groups of contacts are configured to be coupled to a same lens, the two groups of contacts may be counted as one kind.

A group of contacts may refer to a group of contacts that at least include a contact that supplies electric power from a body to a lens attached to the body, and a contact that supplies a drive signal from the body to the lens. The drive signal may be a signal that drives the lens.

An adapter according to an embodiment of the disclosure is configured to be mounted on a camera. The camera includes a body and two or more kinds of groups of contacts provided on the body. The two or more kinds of groups of contacts are configured to be coupled to respective two or more kinds of lenses that include different lens-side mounts.

In the camera according to the embodiment of the disclosure, or in the adapter according to the embodiment of the disclosure, the two or more kinds of groups of contacts are provided on the body. The two or more kinds of groups of contacts are configured to be coupled to the respective two or more kinds of lenses that include the different lens-side mounts. Accordingly, groups of contacts, wirings, and other components may be eliminated from the adapter. This allows for lower profile of the adapter and conversion of groups of contacts between the lens and the body.

According to the camera of the embodiment of the disclosure, or according to the adapter of the embodiment of the disclosure, the two or more kinds of groups of contacts are provided on the body. The two or more kinds of groups of contacts are configured to be coupled to the respective two or more kinds of lenses that include the different lens-side mounts. Hence, it is possible to eliminate groups of contacts, wirings, and other components from the adapter. This allows for the lower profile of the adapter and the conversion of the groups of contacts between the lens and the body. It is to be noted that some effects described here are not necessarily limitative, and any of other effects described herein may be achieved.

BRIEF DESCRIPTION OF DRAWINGS

FIG. 1 is schematic cross-sectional and front views of a configuration of a camera according to an example embodiment of the disclosure.

FIG. 2 illustrates the camera illustrated in FIG. 1, in a case in which a first group of contacts is coupled to a group of contacts of a first lens.

FIG. 3 is a schematic cross-sectional view of the camera illustrated in FIG. 1, in a case in which a second adapter is mounted on a body, and a second group of contacts is coupled to a group of contacts of a lens.

FIG. 4 is a schematic cross-sectional view of the camera illustrated in FIG. 1, in a case in which a third adapter is mounted on the body, and the second group of contacts is coupled to a group of contacts of a lens.

FIG. 5 is a schematic cross-sectional view of the camera illustrated in FIG. 1, in a case in which a fourth adapter is mounted on the body, and the second group of contacts is coupled to a group of contacts of a lens.

FIG. 6 is a side view of an appearance of a body of a camera according to a first embodiment of the disclosure, as seen from right-side-surface side of the body.

FIG. 7 is a front view of an appearance of the body illustrated in FIG. 6, as seen from front.

FIG. 8 is a front view of a configuration of a body-side mount illustrated in FIG. 7, as taken out from a casing and seen from front.

FIG. 9 is a front view of an adapter according to the first embodiment of the disclosure, and a cross-sectional view taken along a line IXB-IXB in the front view.

FIG. 10 is a rear view of the adapter illustrated in FIG. 9.

FIG. 11 is a front view of the adapter illustrated in FIG. 9, as mounted on the body-side mount illustrated in FIG. 8.

FIG. 12 is a front view of an adapter according to a second embodiment of the disclosure, and a cross-sectional view taken along a line XIIB-XIIB in the front view.

FIG. 13 is a rear view of the adapter illustrated in FIG. 12.

FIG. 14 is a front view of the adapter illustrated in FIG. 12, as mounted on the body-side mount illustrated in FIG. 8, with a mounting and dismounting lever of the adapter at an initial position.

FIG. 15 is a front view of the adapter illustrated in FIG. 12, as mounted on the body-side mount illustrated in FIG. 8, with the mounting and dismounting lever of the adapter at a fastening position.

FIG. 16 is a front view of a first application example of a camera according to an example embodiment of the disclosure, in which an adapter for a cinematographic lens is mounted on the body-side mount according to the first embodiment of the disclosure.

FIG. 17 is a side view of the first application example of the camera according to the example embodiment of the disclosure, in which a cinematographic lens is mounted on the adapter illustrated in FIG. 16.

FIG. 18 is a side view of a second application example of a camera according to an example embodiment of the disclosure, in which a lens is mounted on the body-side mount according to the first embodiment of the disclosure, with the adapter according to the first embodiment or the second embodiment of the disclosure interposed therebetween, and the lens has a flange back distance shorter than a flange back distance of a lens-side mount adapted for the body-side mount.

FIG. 19 is a front view of a configuration of a front surface of a body according to a modification example 1.

FIG. 20 is a front view of a configuration of a front surface of a body according to a modification example 2.

FIG. 21 is a front view of a configuration of a front surface of a body according to a modification example 3.

FIG. 22 is a front view of a configuration of a front surface of a body according to a modification example 4.

FIG. 23 is a front view of a configuration of a front surface of a body according to a modification example 5.

FIG. 24 is a front view of a configuration of a front surface of a body according to a modification example 6.

DESCRIPTION OF EMBODIMENTS

In the following, some embodiments of the disclosure are described in detail with reference to the drawings. Note that description is made in the following order.

1. Overall Description
2. First Embodiment (an example with an adapter that adopts a bayonet system)
3. Second Embodiment (an example with an adapter that adopts a breech lock system)
4. First Application Example (an example in which a cinematographic lens is mounted on a body according to an example embodiment of the disclosure, with an adapter for the cinematographic lens interposed therebetween)
5. Second Application Example (an example in which a lens is mounted on a body according to an example embodiment of the disclosure, with an adapter according to an example embodiment of the disclosure interposed therebetween, and the lens has a flange back distance shorter than a flange back distance of a lens-side mount adapted for a body-side mount of the body)
6. Modification Example 1 (an example with a body provided with two kinds of groups of contacts, in which a first group of contacts is disposed on upper side and on right side, while a second group of contacts is disposed on the upper side, in a circumferential direction around an optical axis)
7. Modification Example 2 (an example with a body provided with two kinds of groups of contacts, in which a first group of contacts is disposed on upper side and on right side, while a second group of contacts is disposed on left side, in a circumferential direction around an optical axis)
8. Modification Example 3 (an example with a body provided with two kinds of groups of contacts, in which a first group of contacts is disposed on upper side and on right side, while a second group of contacts is disposed on obliquely lower left side, in a circumferential direction around an optical axis)
9. Modification Example 4 (an example with a body provided with two kinds of groups of contacts, in which a first group of contacts is disposed on left side, while a second group of contacts is disposed on upper side, in a circumferential direction around an optical axis)
10. Modification Example 5 (an example with a body provided with three kinds of groups of contacts)
11. Modification Example 6 (an example with a body provided with four kinds of groups of contacts)
(Overall Description)

Prior to individualized description on specific embodiments, overall description is given first, with reference to FIGS. 1 to 5, on a camera and an adapter according to an example embodiment of the disclosure.

FIG. 1 schematically illustrates a configuration of a camera according to the example embodiment of the disclosure. (A) and (B) of FIG. 1 respectively illustrate a cross-sectional configuration in a direction of an optical axis, and a configuration as seen from front. A camera 1 includes a body 10 and two or more kinds of groups of contacts 40 provided on the body 10. The two or more kinds of groups of contacts 40 are configured to respective two or more kinds of lenses 2A, 2B, . . . (not shown in FIG. 1, refer to FIGS. 2 to 5) that include different lens-side mounts. Thus, in the camera 1, it is possible to attain lower profile of an adapter and conversion of groups of contacts between the lenses 2A, 2B, . . . and the body 10.

In one specific example, as illustrated in FIG. 1, the camera 1 may include a body-side mount 20 on a surface, e.g., a front surface of the body 10. The two or more kinds of groups of contacts 40 may include, for example, a first group of contacts 41 and a second group of contacts 42, as illustrated in FIG. 1 as well. The two or more kinds of groups of contacts 40 may be provided on the same surface on which the body-side mount 20 is provided. In the camera 1, for example, as illustrated in FIG. 2, the first group of contacts 41 may be coupled to a group of lens-side contacts 52A of the lens 2A, when the lens 2A including a lens-side mount 51A adapted for the body-side mount 20 is mounted on the body-side mount 20. Meanwhile, as illustrated in FIG. 3, the second group of contacts 42 may be coupled to a group of lens-side contacts 52B of the lens 2B, when the lens 2B including a lens-side mount 51B different from the lens-side mount 51A is mounted on the body-side mount 20 with an adapter 30B interposed therebetween.

Here, the lens-side mount 51B being different from the lens-side mount 51A may mean that the lens-side mounts 51A and 51B are different in shapes with which mechanical fitting into the body 10 is made. In one specific example, the lens-side mounts 51A and 51B may be different in diameters of apertures where the fitting is made. Alternatively, the lens-side mount 51B being different from the lens-side mount 51A may mean that the lens-side mounts 51A and 51B are different in flange back distances FB51A and FB51B.

Description is Made Below in Further Detail.

The body 10 illustrated in FIG. 1 may incorporate an imaging device 11, and may be provided with the body-side mount 20 on the front surface. An optical component 13 may be so disposed, on the front surface of the body 10, as to face the imaging device 11.

In the following description and figures, Z denotes the direction of the optical axis. An optical axis A may be a line that passes the lenses 2A, 2B, . . . , the optical component 13, and a center of the imaging device 11. In the direction of the optical axis Z, the lenses 2A, 2B, . . . side is referred to as frontward, while body 10 side is referred to as rearward. X denotes a horizontal direction, as seen from front of the body-side mount 20. Y denotes a vertical direction, as seen from front of the body-side mount 20.

The body-side mount 20 illustrated in FIG. 1 may have, for example, an aperture diameter AP20 and a flange back distance FB20 unique to itself. The aperture diameter AP20 may be a diameter of an aperture of the body-side mount 20. The flange back distance FB20 may be a distance from a first reference plane P1 of the body-side mount 20 to an imaging plane P11 in the direction of the optical axis Z, and may be a value unique to each model of the body 10 or the body-side mount 20. The first reference plane P1 may be a plane where the body-side mount 20 makes contact with a rear end of the lens 2A (refer to FIG. 2). The imaging plane P11 may correspond to, for example, a plane where light enters a photodiode of the imaging device 11.

The lens 2A illustrated in FIG. 2 may include, for example, the lens-side mount 51A and the group of lens-side contacts 52A. The lens-side mount 51A may have an aperture diameter AP51A and a flange back distance FB51A that are respectively adapted for the aperture diameter AP20 and the flange back distance FB20 unique to the body-side mount 20.

Meanwhile, the lens 2B illustrated in FIG. 3 may include, for example, the lens-side mount 51B and the group of lens-side contacts 52B. The lens-side mount 51B may have an aperture diameter AP51B and a flange back distance FB51B, one or both of which may be different from those of the lens-side mount 51A.

Basically, the body-side mount 20 may take the lens 2A that includes the lens-side mount 51A adapted for the aperture diameter AP20 and the flange back distance FB20 unique to the body-side mount 20 (refer to FIG. 2). Meanwhile, there may be a case in which it is desired to mount, on the body-side mount 20, the lens 2B that includes the lens-side mount 51B different from the lens-side mount 51A (refer to FIG. 3). In such a case, the use of the adapter 30B may allow for mechanical conversion of shapes with which coupling is made between the body-side mount 20 and the lens-side mount 51B different in the aperture diameters AP20 and AP51B. The use of the adapter 30B may also allow for conversion as to the groups of contacts for communication between the lens 2B and the body 10.

At this occasion, the conversion of the groups of contacts between the lens 2B and the body 10 may be possible, by providing the adapter 30B with groups of contacts and inserting wirings and other components through inside the adapter 30B, when a difference ΔFB is sufficiently large between the flange back distance FB51A of the lens-side mount 51A and the flange back distance FB51B of the lens-side mount 51B of the lens 2B to be mounted.

However, when the difference ΔFB between the flange back distance FB51A of the lens-side mount 51A and the flange back distance FB51B of the lens-side mount 51B of the lens 2B to be mounted is as small as, for example, 12 mm or less, or furthermore, 10 mm or less, it becomes difficult to provide the adapter 30B with the groups of contacts or to insert the wirings or other components through inside the adapter 30B.

Thus, in the example embodiment, as described, the two or more kinds of groups of contacts 40 are provided on the body 10. The two or more kinds of groups of contacts 40 are configured to be coupled to the respective two or more kinds of lenses 2A, 2B, . . . that include the different lens-side mounts 51A, 51B, . . . . Hence, in the camera 1, it is possible to switch coupling of the first group of contacts 41 to the group of lens-side contacts 51A of the lens 2A with coupling of the second group of contacts 42 to the group of lens-side contacts 52B of the lens 2B, without providing the adapter 30B with the groups of contacts and the wirings. This allows for lower profile of the adapter 30B and the conversion of the groups of contacts between the lens 2B and the body 10.

In one preferred example, one kind, e.g., the first group of contacts 41, of the two or more kinds of groups of contacts 40 may be configured to be coupled to the lens 2A that includes the lens-side mount 51A adapted for a PL mount. In other words, one kind, e.g., the first group of contacts 41, of the two or more kinds of groups of contacts 40 may be configured to be coupled to the lens 2A that includes the lens-side mount 51A adapted for the body-side mount 20 having the flange back distance FB20 of 52 mm. It is to be noted that, in this case, the first group of contacts 41 may be disposed apart at two positions (on upper side and on right side) in a circumferential direction around the optical axis A, as illustrated in (B) of FIG. 1. The first group of contacts 41 at the two positions, being configured to be coupled to the same lens 2A, may be counted as one kind in the specification.

In one preferred example, as illustrated in (A) of FIG. 1, the two or more kinds of groups of contacts 40 may be disposed at different positions in the direction of the optical axis Z. In other words, in one preferred example, the two or more kinds of groups of contacts 40 may be different from one another in distances from the imaging plane P11 in the direction of the optical axis Z. In one specific and preferred example, a distance D41 from the imaging plane P11 to the first group of contacts 41 may be different from a distance D42 from the imaging plane P11 to the second group of contacts 42, depending on the difference ΔFB in the flange back distances. This makes it possible to avoid interference of the lens 2A (or another one of the lenses 2B, . . . ) with other kinds of groups of contacts, when the lens 2A (or another one of the lenses 2B, . . . ) is mounted to establish coupling to one kind of the two or more kinds of groups of contacts 40.

Moreover, in one preferred example, as illustrated in (B) of FIG. 1, the two or more kinds of groups of contacts 40 may be disposed at different positions in a radial direction with respect to the optical axis A. This makes it possible to avoid interference of the lens 2A (or another one of the lenses 2B, . . . ) with other kinds of groups of contacts, when the lens 2A (or another one of the lenses 2B, . . . ) is mounted to establish coupling to one kind of the two or more kinds of groups of contacts 40. Also, as described later, it is possible to allow the second group of contacts 42 to be exposed on inner circumferential side of the adapter 30B with the adapter 30B mounted on the camera 1, making it possible to easily couple the second group of contacts 42 to the lens 2B.

Furthermore, in one preferred example, as illustrated in (B) of FIG. 1 as well, the two or more kinds of groups of contacts 40 may be disposed at circumferentially-shifted positions around the optical axis A. This makes it possible to avoid interference of the lens 2A (or another one of the lenses 2B, . . . ) with other kinds of groups of contacts, when the lens 2A (or another one of the lenses 2B, . . . ) is mounted to establish coupling to one kind of the two or more kinds of groups of contacts 40.

The two or more kinds of groups of contacts 40 may be coupled, inside the body 10, to different grounds, different power supplies, and different wirings. Alternatively, the two or more kinds of groups of contacts 40 may share, inside the body 10, at least one of a ground, a power supply, and a wiring.

It is to be noted that (B) of FIG. 1 depicts a case in which the first group of contacts 41 is disposed more radially inwardly than the second group of contacts 42 is, and the first group of contacts 41 is disposed on the upper side and on the right side, while the second group of contacts 42 is disposed on the lower side, in the circumferential direction around the optical axis A. However, positional relation of the first group of contacts 41 and the second group of contacts 42 in the radial and circumferential directions with respect to the optical axis A may be modified in various ways in accordance with configurations of the lenses 2A, 2B, . . . to be mounted.

Moreover, FIG. 3 depicts a case in which the flange back distance FB51B of the lens-side mount 51B is shorter than the flange back distance FB51A of the lens-side mount 51A, and the difference ΔFB in the flange back distances is generated on the imaging plane P11 side of the first reference plane P1 in the direction of the optical axis Z. However, the description given above may be applied as well to a case in which, as illustrated in FIG. 4, the difference ΔFB in the flange back distances is generated on lens 2C side of the first reference plane P1 in the direction of the optical axis Z. In this case, a lens-side mount 51C of a lens 2C may have a flange back distance FB51C longer than the flange back distance FB51A of the lens-side mount 51A, and the lens 2C may be mounted on the body-side mount 20 with an adapter 30C interposed therebetween. A group of lens-side contacts 52C of the lens 2C may be coupled to, for example, the second group of contacts 42. In one preferred example, a position of the second group of contacts 42 in the direction of the optical axis Z may be adjusted to allow for coupling to the group of lens-side contacts 52C of the lens 2C.

In another alternative, the description given above may be applied as well to a case in which, as illustrated in FIG. 5, the difference ΔFB in the flange back distances is zero (0) in the direction of the optical axis Z. In this case, a lens-side mount 51D of a lens 2D may have a flange back distance FB51D equal to the flange back distance FB51A of the lens-side mount 51A, and an aperture diameter AP51D different from the aperture diameter AP51A of the lens-side mount 51A. The lens 2D may be, therefore, mounted on the body-side mount 20 with an adapter 30D interposed therebetween. A group of lens-side contacts 52D of the lens 2D may be coupled to, for example, the second group of contacts 42. In one preferred example, the position of the second group of contacts 42 in the direction of the optical axis Z may be adjusted to allow for coupling to the group of lens-side contacts 52D of the lens 2D.

In the following, description is given on some embodiments (a first embodiment and a second embodiment) that embody the camera 1 and the adapters 30B to 30D as described.

First Embodiment

FIG. 6 illustrates an appearance of a body 10 of a camera 1 according to the first embodiment of the disclosure, as seen from right-side-surface side of the body 10. FIG. 7 illustrates an appearance of the body 10 illustrated in FIG. 6, as seen from front. The camera 1 may be, for example, a cinematographic camera, and may include a body-side mount 20 in a foremost part of the body 10 in the direction of the optical axis Z. The body 10 may include a casing 14. The imaging device 11 (not illustrated in FIG. 6, refer to (A) of FIG. 1) may be incorporated in the casing 14. A recording start button 14A, a menu selection button 14B, a side panel 14C, operation buttons and adjustment buttons of various kinds, accessory mounting parts for a view finder and other accessories, an external memory accommodation part, a USB coupling part, a battery coupling part, and other functional parts may be appropriately arranged on surfaces of the casing 14.

The body-side mount 20 may serve as a coupling part between the lens 2A (refer to FIG. 2) or the adapter 30B, 30C, or 30D (refer to FIGS. 3 to 5)) and the body 10. As illustrated in FIG. 7, the body-side mount 20 may be provided in an upper center part of a front surface of the casing 14 of the body 10. The optical component 13 may be provided in a center part inside the body-side mount 20. The imaging device 11 (not illustrated in FIG. 7, refer to (A) of FIG. 1) may be disposed behind the optical component 13 in the direction of the optical axis Z. The two or more kinds of groups of contacts 40, e.g., the first group of contacts 41 and the second group of contacts 42, may be provided in a region inside the body-side mount 20 and around the optical component 13. Moreover, an operation dial 15 may be provided on obliquely lower right side in the front surface of the casing 14 of the body 10. The operation dial 15 may be an operation part that allows a user to switch optical components such as ND filters (dimmer filters) interposed between the optical component 13 and the imaging device 11. It is to be noted that the operation dial 15 is not limited to a rotation type (a dial type) as in the embodiment. For example, the operation dial 15 may be of a push type such as an operation button.

FIG. 8 illustrates a configuration of the body-side mount 20 illustrated in FIG. 7, as taken out from the casing 14 and seen from front. The body-side mount 20 may be fixed to and unified with a chassis 16. The body-side mount 20 may occupy a region from a left part to an upper part of the chassis 16. The chassis 16 may include an accommodation part 16A on lower side and on obliquely lower right side of the body-side mount 20. The accommodation part 16A may accommodate a turret (not illustrated) that supports the optical components such as the ND filters as described. The number of the optical components such as the ND filters may be, for example, three or four. The operation dial 15 as described may be provided on obliquely lower right side of the accommodation part 16A, allowing a user to turn the operation dial 15 to cause the turret to turn to switch the optical components such as the ND filters.

The body-side mount 20 may adopt a breech lock system as a mount system of the lens 2A or the adapter 30B, 30C, or 30D, and may include a mounting ring 21, a support ring 22, and a fastening ring 23 in the order named from inner circumferential side. It is to be noted that FIG. 8 depicts solely the mounting ring 21 and the support ring 22, and that the fastening ring 23 is depicted not in FIG. 8 but in FIG. 7. The adoption of the breech lock system in the body-side mount 20 makes it possible to allow the lens 2A or a large-sized and heavy-weighed cinematographic lens to be robustly fastened to the body 10, leading to higher reliability. There is also another advantage that the lens 2A or other lenses may be mounted and dismounted without turning them.

The mounting ring 21 may be a part on which a rear end of the lens 2A or the adapter 30B, 30C, or 30D is seated. The mounting ring 21 may include the first reference plane P1. The first reference plane P1 may be a plane on which the rear end of the lens 2A or the adapter 30B, 30C, or 30D is mounted. A distance from the first reference plane P1 to the imaging plane P11 in the direction of the optical axis Z may constitute the flange back distance FB20 (refer to (A) of FIG. 1) unique to the body 10. The body 10 may basically take the lens 2A (refer to FIG. 2) that includes the lens-side mount 51A having the flange back distance FB51A adapted for the flange back distance FB20.

The support ring 22 may be a part that supports the rear end of the lens 2A or the adapter 30B, 30C, or 30D. The support ring 22 may include tabs 22A at circumferentially-spaced three positions. The tabs 22A may extend over the first reference plane P1 of the mounting ring 21, allowing the rear end of the first lens 2A or the adapter 30B, 30C, or 30D to be interposed and supported between the first reference plane P1 and the tabs 22A. It is to be noted that, as illustrated in FIG. 8, the aperture diameter AP20 of the body-side mount 20 may be adapted for a minimum aperture diameter of the support ring 22.

The fastening ring 23 may turn around the optical axis A together with the support ring 22, to fasten and fix the lens 2A or the adapter 30B, 30C, or 30D to the body-side mount 20. In one preferred example, uneven slip prevention 23A may be provided in an outer side surface of the fastening ring 23, making it easier for a user to grip and turn the fastening ring 23.

The optical component 13 may be, for example, a glass plate member that may serve as protection of the imaging device 11 and have appropriate optical functions. The optical component 13 may be shaped as, for example, a rectangle elongated in one direction, and may be laterally-long disposed in a center part of a circular region surrounded by the body-side mount 20. Incidentally, it is to be appreciated that the imaging device 11 may be also laterally-long disposed, similarly to the optical component 13. The optical component 13 may be supported by an optical component holder 17. The optical component holder 17 may be fixed to the chassis 16 with screws 17A and 17B.

As described, the two or more kinds of groups of contacts 40 are configured to be coupled to the respective two or more kinds of lenses 2A, 2B, . . . that include the different lens-side mounts 51A, 51B, . . . . Thus, in the camera 1, it is possible to attain the lower profile of the adapters 30B to 30D and the conversion of the groups of contacts between the lenses 2A, 2B, . . . and the body 10.

The first group of contacts 41 may establish electrical coupling of the lens 2A to the body 10 (refer to FIG. 2). The lens 2A may include the lens-side mount 51A having the aperture diameter AP51A and the flange back distance FB51A adapted for those of the body-side mount 20. The first group of contacts 41 may refer to a group of contacts that at least include, for example, a contact that supplies electric power from the body 10 to the lens 2A attached to the body 10, and a contact that supplies a drive signal from the body 10 to the lens 2A. The drive signal may be a signal that drives the lens 2A.

The first group of contacts 41 may be disposed, for example, on left side in the circumferential direction around the optical axis A, as seen from front of the body-side mount 20. In other words, the first group of contacts 41 may be disposed in a circular-arc-shaped arrangement along a left short side of the optical component 13. The first group of contacts 41 may be supported by a first contact group holder 41A. The first contact group holder 41A may be fixed to and supported by the chassis 16 with screws 41B and 41C.

The second group of contacts 42 may couple the lens 2B or 2C to the body 10 (refer to FIG. 3 or 4). The lens 2B may include the lens-side mount 51B having the aperture diameter AP51B and the flange back distance FB51B, one or both of which may be different from the aperture diameter AP51A and the flange back distance FB51A of the lens-side mount 51A. The lens 2C may include the lens-side mount 51C having the aperture diameter AP51C and the flange back distance FB51C, one or both of which may be different from the aperture diameter AP51A and the flange back distance FB51A of the lens-side mount 51A. Alternatively, the second group of contacts 42 may couple the lens 2D to the body 10 (refer to FIG. 5). The lens 2D may have the flange back distance FB51D equal to the flange back distance FB51A of the lens-side mount 51A, and the aperture diameter AP51D different from the aperture diameter AP51A of the lens-side mount 51A. The second group of contacts 42 may refer to a group of contacts that at least include, for example, a contact that supplies electric power from the body 10 to the lens 2B (or the lens 2C or 2D) attached to the body 10, and a contact that supplies a drive signal from the body 10 to the lens 2B (or the lens 2C or 2D). The drive signal may be a signal that drives the lens 2B (or the lens 2C or 2D).

The second group of contacts 42 may be disposed, for example, on lower side in the circumferential direction around the optical axis A, as seen from front of the body-side mount 20. In other words, the second group of contacts 42 may be disposed in a circular-arc-shaped arrangement along a lower long side of the optical component 13. The second group of contacts 42 may be supported by a second contact group holder 42A. The second contact group holder 42A may be fixed to and supported by the chassis 16 with screws 42B and 42C.

(A) of FIG. 9 illustrates a configuration of the adapter 30B according to the first embodiment of the disclosure, as seen from front. (B) of FIG. 9 illustrates a configuration in cross-section taken along a line IXB-IXB in (A) of FIG. 9. It is to be noted that the adapter 30B illustrated in FIG. 9 may be used in a case in which, as illustrated in FIG. 3, the flange back distance FB51B of the lens-side mount 51B is shorter than the flange back distance FB51A of the lens-side mount 51A, and the difference ΔFB is generated on the imaging plane P11 side of the first reference plane P1 in the direction of the optical axis Z.

As illustrated in FIG. 3, the adapter 30B is configured to be mounted on the first reference plane P1 of the body-side mount 20. The body-side mount 20 includes the first reference plane P1 as described, and has the flange back distance FB20 from the first reference plane P1 to the imaging plane P11. Also, the adapter 30B includes the second reference plane P2, and has the flange back distance FB30B from the second reference plane P2 to the imaging plane P11. The flange back distance FB30B is shorter than the flange back distance FB20. The second reference plane P2 may be a plane on which the lens 2B (refer to FIG. 3) is mounted. Owing to the adapter 30B, it is possible to take the lens 2B that includes the lens-side mount 51B having the flange back distance FB51B shorter than the flange back distance FB51A of the lens-side mount 51A, without replacement of the whole body-side mount 20.

In one specific example, the adapter 30B may include, for example, as illustrated in (A) and (B) of FIG. 9, an outer circumferential part 32, an inner circumferential part 33, and an intermediate part 34. The adapter 30 may have a circular-shaped aperture 33A on inner circumferential side. An aperture diameter AP30B of the adapter 30B may be smaller than the aperture diameter AP20 of the body-side mount 20, and may be equal to the aperture diameter AP51B of the lens-side mount 51A, as illustrated in FIG. 3.

The outer circumferential part 32 may be a part that is configured to be mounted on the first reference plane P1 of the body-side mount 20, and may include a mounting plane 31. The mounting plane 31 may be a plane that makes contact with the first reference plane P1 when the adapter 30B is mounted on the first reference plane P1 of the body-side mount 20. The outer circumferential part 32 may include outer tabs 32A at circumferentially-spaced three positions. The outer tabs 32A are provided for mounting on the body-side mount 20.

The inner circumferential part 33 may be provided inside the outer circumferential part 32, concentrically with the outer circumferential part 32. The inner circumferential part 33 may include the second reference plane P2. In one preferred example, the second reference plane P2 may be positioned, in the direction of the optical axis Z, closer to the imaging plane P11 than the mounting plane 31 is. This makes it possible to allow the lens 2B to be mounted on the body-side mount 20 with the adapter 30 in between. The lens 2B may include the lens-side mount 51B having the flange back distance FB51B shorter than that of the lens-side mount 51A.

The intermediate part 34 may be a part that couples the outer circumferential part 32 and the inner circumferential part 33 together in the direction of the optical axis Z. The intermediate part 34 may have an appropriately shouldered part in accordance with the difference ΔFB in the flange back distances of the lens-side mounts 51A and 51B. In this case, the intermediate part 34 may include an inclined plane 34A that links the outer circumferential part 32 and the inner circumferential part 33 together. The inclined plane 34A makes it possible to take lenses of various shapes. In addition, the inclined plane 34A may produce margin space around a lens dismounting button 35C to be described later. This makes it easier for a user to press the lens dismounting button 35C.

FIG. 10 illustrates a configuration of the adapter 30B illustrated in FIG. 9, as seen from rear surface side. The adapter 30B may adopt a bayonet system as a mount system of the lens 2B, and may include, for example, inner tabs 35A, a bayonet mechanism 35B, and the lens dismounting button 35C.

The inner tabs 35A may be provided for mounting of the lens 2B on the second reference plane P2. The inner tabs 35A may be provided, for example, as illustrated in (A) of FIG. 9, at circumferentially-spaced three positions of the aperture 33A of the inner circumferential part 33.

The bayonet mechanism 35B may be a spring mechanism provided on rear side of the inner tabs 35A, as illustrated in FIG. 10. The bayonet mechanism 35B may press the lens 2B to the second reference plane P2, to restrain displacement or positional deviation of the lens 2B in the direction of the optical axis Z.

The lens dismounting button 35C may be a push button that allows the lens 2B to be dismounted from the adapter 30, as illustrated in (A) of FIG. 9. The lens dismounting button 35C may be provided on obliquely lower left side of the outer circumferential part 32 and the intermediate part 34.

Moreover, in one preferred example, the lens dismounting button 35C may be more protruded, in the direction of the optical axis Z, toward the lens 2B than a front surface 32A of the outer circumferential part 32, as illustrated in (B) of FIG. 9. This makes it possible for a user to easily press the lens dismounting button 35C not with a tiptoe but with a finger cushion. This leads to enhancement in usability.

FIG. 11 illustrates a configuration of the adapter 30B, as mounted on the body-side mount 20 as illustrated in FIG. 8 and seen from front of the body-side mount 20. It is to be noted that FIG. 11 depicts the fastening ring 23 that is omitted in FIG. 8.

In one preferred example, when the adapter 30 is mounted on the first reference plane P1, the first group of contacts 41 may be hidden behind the adapter 30B, while the second group of contacts 42 may be exposed in the aperture 33A on the inner circumferential side of the adapter 30B. This makes it possible, as described later, to easily couple the second group of contacts 42 exposed in the aperture 33A of the adapter 30 to the lens 2B. Meanwhile, the first group of contacts 41 may be hidden behind the adapter 30, allowing a user to easily and visually recognize the situation not to allow for the mounting of the lens 2A. Hence, it is possible to avoid mistakes in lens mounting.

Moreover, in one preferred example, the fastening ring 23 may include a notch 23B provided along a part of the fastening ring 23 in a circumferential direction of the fastening ring 23. For example, the notch 23B may be provided along a lower part in the circumferential direction of the fastening ring 23, as seen from front of the body-side mount 20. The notch 23B may be a part in the circumferential direction of the fastening ring 23, in which a height of the fastening ring 23 in the direction of the optical axis Z is reduced. This makes it possible to produce space along the lower part of the fastening ring 23, and to avoid interference of a component protruding downward from a lens barrel of the lens 2A, or 2B, . . . with the fastening ring 23. In one preferred example, the notch 23B may have the height in the direction of the optical axis Z that allows the notch 23B to form a same plane or a substantially same plane as the support ring 22.

The fastening ring 23 may include a rising wall 23C provided along a part other than the notch 23B. In one preferred example, the rising wall 23C may have a central angle α around the optical axis A being equal to or larger than 180°. This makes it possible for a user to easily grip and turn the rising wall 23C. It is to be noted that the uneven slip prevention 23A may be provided solely in the rising wall 23C, or may be provided in both the rising wall 23C and the notch 23B.

In one preferred example, the lens dismounting button 35C of the adapter 30 may be provided within a range of the notch 23B of the fastening ring 23. This makes it possible for a user to easily press the lens dismounting button 35C, leading to enhanced convenience.

Moreover, in one preferred example, the lens dismounting button 35C of the adapter 30 may be provided on obliquely lower side in the circumferential direction of the body-side mount 20, as seen from front of the body-side mount 20. For example, the lens dismounting button 35C may be provided on obliquely lower left side or on obliquely lower right side. When the lens dismounting button 35C is provided on lower side in the circumferential direction of the body-side mount 20, there may be possibility that the lens dismounting button 35C may interfere with a component attached to a lower part of the lens 2B, causing difficulties in operating the lens dismounting button 35C. Moreover, in many cases, the lens dismounting button 35C may be operated by an assistant photographer who stands beside the camera 1 in assisting a chief photographer. The lens dismounting button 35C may be, therefore, disposed on the obliquely lower left side or on the obliquely lower right side, making it easier for the assistant photographer to operate the lens dismounting button 35C. This leads to enhancement in work efficiency. It is to be noted that FIG. 11 represents an example in which the operation dial 15 is disposed on the obliquely lower right side while the lens dismounting button 35C is disposed on the obliquely lower left side. However, both the operation dial 15 and the lens dismounting button 35C may be disposed on the obliquely lower left side. Alternatively, both the operation dial 15 and the lens dismounting button 35C may be disposed on the obliquely lower right side.

In the camera 1, the lens 2B and the adapter 30B may be attached to the body 10, for example, as follows.

First, the outer tabs 32A of the outer circumferential part 32 of the adapter 30B may be fitted into between the tabs 22A of the support ring 22 of the body-side mount 20. Next, the fastening ring 23 may be turned around in a fastening direction. This causes the outer tabs 32A of the adapter 30B to be interposed between the tabs 22A of the body-side mount 20 and the first reference plane P1. Thus, the adapter 30B may be mounted on and fixed to the first reference plane P1 of the body-side mount 20.

At this occasion, as illustrated in FIG. 11, when the adapter 30B is mounted on the first reference plane P1, the first group of contacts 41 may be hidden behind the adapter 30B, while the second group of contacts 42 may be exposed in the aperture 33A on the inner circumferential side of the adapter 30B. This makes it possible to easily couple the second group of contacts 42 exposed in the aperture 33A of the adapter 30 to the lens 2B. Meanwhile, the first group of contacts 41 may be hidden behind the adapter 30, allowing a user to easily and visually recognize the situation not to allow for the mounting of the lens 2A. Hence, it is possible to avoid mistakes in lens mounting.

Thereafter, tabs (not illustrated) at the rear end of the lens 2B may be fitted into between the inner tabs 35A of the inner circumferential part 33 of the adapter 30B. Then, the lens 2B may be turned. This allows the lens 2B to be mounted on and fixed to the second reference plane P2 of the adapter 30B. Thus, the second group of contacts 42 may be coupled to the group of lens-side contacts 52B of the lens 2B (refer to FIG. 3).

As described, in the embodiment, the two or more kinds of groups of contacts 40 are provided on the body 10. The two or more kinds of groups of contacts 40 are configured to be coupled to the respective two or more kinds of lenses 2A, 2B, . . . that include the different lens-side mounts 51A, 51B, . . . . Hence, it is possible to eliminate groups of contacts, wirings, and other components from the adapter 30B. This allows for the lower profile of the adapter 30B and the conversion of the groups of contacts between the lenses 2A, 2B, . . . and the body 10. Also, it is unnecessary to insert wirings or other components through inside the adapter 30B. This makes it possible to easily realize a water-proof and dust-proof structure of the adapter 30B.

Second Embodiment (A) of FIG. 12 illustrates a configuration of an adapter 30B according to the second embodiment of the disclosure, as seen from front. (B) of FIG. 12 illustrates a configuration in cross-section taken along a line XIIB-XIIB in (A) of FIG. 12. FIG. 13 illustrates a configuration of the adapter 30B illustrated in FIG. 12, as seen from rear surface side. The adapter 30B according to the embodiment is different from the adapter 30B according to the forgoing first embodiment in the breech lock system adopted as the mount system of the lens 2B. Description is therefore made, with corresponding components denoted by same references.

In one specific example, the adapter 30B may include, as illustrated in (A) and (B) of FIG. 12, the outer circumferential part 32, the inner circumferential part 33, the intermediate part 34, a fastening part 36, and a breech lock mechanism 37. The adapter 30B may have the circular-shaped aperture 33A on the inner circumferential side. The aperture diameter of the adapter 30B may be smaller than the aperture diameter of the body-side mount 20.

The outer circumferential part 32 may be a part that is configured to be mounted on the first reference plane P1 of the body-side mount 20, and may include the mounting plane 31. The mounting plane 31 may be a plane that makes contact with the first reference plane P1 when the adapter 30B is mounted on the first reference plane P1 of the body-side mount 20. The outer circumferential part 32 may include the outer tabs 32A at circumferentially-spaced three positions. The outer tabs 32A are provided for the mounting on the body-side mount 20.

The fastening part 36 may turn around the optical axis A to allow the lens 2B to be fastened or fixed to, or removed from the adapter 30B. The fastening part 36 may be fixed, with a screw 36A, to a front part of the outer circumferential part 32 in the direction of the optical axis Z. The fastening part 36 may be provided with a mounting and dismounting lever 36B. The mounting and dismounting lever 36B may be an operation lever that allows the lens 2B to be fastened to the adapter 30B or allows the lens 2B to be removed from the adapter 30B. As illustrated in (A) of FIG. 12, the mounting and dismounting lever 36B may be provided on obliquely upper left side in a circumferential direction of the fastening part 36. Moreover, the fastening part 36 may include an inclined plane 36C along a border of the inner circumferential part 33. The inclined plane 36C makes it possible to take lenses of various shapes. In addition, the inclined plane 36C may provide margin space around the mounting and dismounting lever 36B. This makes it possible for a user to easily operate the mounting and dismounting lever 36B.

The inner circumferential part 33 may be provided inside the outer circumferential part 32, concentrically with the outer circumferential part 32. The inner circumferential part 33 may include the second reference plane P2. In one preferred example, the second reference plane P2 may be positioned, in the direction of the optical axis Z, closer to the imaging plane PI1 than the mounting plane 31 is. This makes it possible to allow the lens 2B to be mounted on the body-side mount 20 with the adapter 30 in between. The lens 2B may include the lens-side mount 51B having the flange back distance FB51B shorter than the flange back distance FB51A of the lens-side mount 51A.

The breech lock mechanism 37 may be provided behind the inner circumferential part 33 in the direction of the optical axis Z, and may include inner tabs 37A at circumferentially-spaced three positions. The breech lock mechanism 37 may be fixed to the fastening part 36 by a link part 37B, and may turn around the optical axis A in accordance with turning of the fastening part 36. The link part 37B may be provided in a guide groove 32B carved along a part of the outer circumferential part 32 in a circumferential direction. It follows, therefore, that a range of movement of the link part 37B and the fastening part 36 may be defined by the guide groove 32B.

The intermediate part 34 may be a part that couples the fastening part 36 and the outer circumferential part 32 to the inner circumferential part 33 in the direction of the optical axis Z. The intermediate part 34 may include the shouldered part and the inclined plane 34A, similarly to the first embodiment.

FIGS. 14 and 15 illustrate a configuration of the adapter 30B, as mounted on the body-side mount 20 illustrated in FIG. 8 and seen from front of the body-side mount 20. FIG. 14 depicts a case with the mounting and dismounting lever 36B at an initial position PI. FIG. 15 depicts a case with the mounting and dismounting lever 36B at a fastening position PT. It is to be noted that FIGS. 14 and 15 depict the fastening ring 23 that is omitted in FIG. 8.

In one preferred example, when the adapter 30B is mounted on the first reference plane P1, the first group of contacts 41 may be hidden behind the adapter 30B, while the second group of contacts 42 may be exposed in the aperture 33A on the inner circumferential side of the adapter 30B, similarly to the first embodiment. This makes it possible to easily couple the second group of contacts 42 exposed in the aperture 33A of the adapter 30B to the lens 2B. Meanwhile, the first group of contacts 41 may be hidden behind the adapter 30B, allowing a user to easily and visually recognize the situation not to allow for the mounting of the first lens 2A. Hence, it is possible to avoid mistakes in lens mounting.

Moreover, in one preferred example, the fastening ring 23 may include the notch 23B provided along a part of the fastening ring 23 in the circumferential direction of the fastening ring 23, similarly to the first embodiment. For example, the notch 23B may be provided along the lower part in the circumferential direction of the fastening ring 23, as seen from front of the body-side mount 20. In one preferred example, the notch 23B may have the height in the direction of the optical axis Z that allows the notch 23B to form the same plane or the substantially same plane as the support ring 22.

The fastening ring 23 may include the rising wall 23C provided along the part other than the notch 23B, similarly to the first embodiment. In one preferred example, the rising wall 23C may have the central angle α around the optical axis A being equal to or larger than 180°, similarly to the first embodiment.

In one preferred example, a range of movement R36B of the mounting and dismounting lever 36B of the adapter 30 may be provided within the range of the rising wall 23C. The rising wall 23C may be provided along the part other than the notch 23B of the fastening ring 23. This makes it possible for a user to operate the mounting and dismounting lever 36B without causing interference with a component protruded downward from the lens barrel of the lens 2B.

Moreover, in one preferred example, the range of movement R36B of the mounting and dismounting lever 36B of the adapter 30 may be provided on obliquely upper side in the circumferential direction of the body-side mount 20, as seen from front of the body-side mount 20. For example, the mounting and dismounting lever 36B may be provided on obliquely upper left side or on obliquely upper right side. When the mounting and dismounting lever 36B is provided on upper side in the circumferential direction of the body-side mount 20, a user may be easily confused whether he or she should turn the mounting and dismounting lever 36B clockwise or counterclockwise to fasten the adapter 30B. Meanwhile, when the mounting and dismounting lever 36B is provided on the obliquely upper side, a user may easily grasp, visually and intuitively, that he or she can fasten the adapter 30B by turning downward the mounting and dismounting lever 36B. Moreover, in many cases, the mounting and dismounting lever 36B may be operated by an assistant photographer who stands beside the camera 1 in assisting a chief photographer. The mounting and dismounting lever 36B may be, therefore, disposed on the obliquely upper side, making it easier for the assistant photographer to operate the mounting and dismounting lever 36B. This leads to enhancement in work efficiency.

In one specific and preferred example, the initial position PI of the mounting and dismounting lever 36B illustrated in FIG. 14 may be on the obliquely upper left side in the circumferential direction of the body-side mount 20 as seen from front of the body-side mount 20, while the fastening position PT of the mounting and dismounting lever 36B illustrated in FIG. 15 may be at a position where the mounting and dismounting lever 36B is turned counterclockwise CCW from the initial position PI. It is to be noted that, depending on a direction in which the fastening part 36 is turned for fastening, the initial position PI of the mounting and dismounting lever 36B may be on the obliquely upper right side, while the fastening position PT of the mounting and dismounting lever 36B may be at a position where the mounting and dismounting lever 36B is turned clockwise from the initial position PI.

In the camera 1, the adapter 30B and the lens 2B may be attached to the body 10, for example, as follows.

First, the outer tabs 32A of the outer circumferential part 32 of the adapter 30B may be fitted into between the tabs 22A of the support ring 22 of the body-side mount 20. Next, the fastening ring 23 may be turned in the fastening direction. This causes the outer tabs 32A of the adapter 30B to be interposed between the tabs 22A of the body-side mount 20 and the first reference plane P1. Thus, the adapter 30B may be mounted on and fixed to the first reference plane P1 of the body-side mount 20.

At this occasion, as illustrated in FIGS. 14 and 15, when the adapter 30B is mounted on the first reference plane P1, the first group of contacts 41 may be hidden behind the adapter 30B, while the second group of contacts 42 may be exposed in the aperture 33A on the inner circumferential side of the adapter 30B. This makes it possible to easily couple the second group of contacts 42 exposed in the aperture 33A of the adapter 30B to the lens 2B. Meanwhile, the first group of contacts 41 may be hidden behind the adapter 30, allowing a user to easily and visually recognize the situation not to allow for the mounting of the lens 2A. Hence, it is possible to avoid mistakes in lens mounting.

Thereafter, tabs (not illustrated) at the rear end of the lens 2B may be fitted into between the inner tabs 37A of the breech lock mechanism 37 of the adapter 30B. Then, the mounting and dismounting lever 36B may be moved from the initial position PI illustrated in FIG. 14 to the fastening position PT illustrated in FIG. 15. This allows the lens 2B to be mounted on and fixed to the second reference plane P2 of the adapter 30.

At this occasion, in one preferred example, a direction of turning to release the fastening ring 23 in the body-side mount 20 may be opposite, around the optical axis A, to a direction of turning to turn the fastening part 36 and to dismount the lens 2B from the second reference plane P2. In this way, when a user turns the fastening ring 23 of the body-side mount 20 in a direction of release of the fastening ring 23, the direction in which the user turns the fastening ring 23 may serve as, to the contrary, a direction in which the lens 2B is fastened more tightly. Accordingly, even when a user wants to dismount the lens 2B from the adapter 30 and mistakenly turns clockwise CW the fastening ring 23 of the body-side mount 20, instead of turning the mounting and dismounting lever 36B, nothing comes off. Meanwhile, even when a user wants to fasten the lens 2B to the adapter 30 and mistakenly turns counterclockwise CCW the fastening ring 23 of the body-side mount 20, instead of turning the mounting and dismounting lever 36B, nothing comes off. Thus, the adapter 30 and the lens 2B may be prevented from being unintentionally dismounted from the body-side mount 20. Hence, it is possible to enhance stability and safety in lens mounting.

As described, the embodiment adopts the breech lock system as the mount system of the lens 2B on the adapter 30B. This makes it possible to fasten the lens 2B more robustly to the adapter 30B, in addition to effects in the first embodiment. Moreover, the body-side mount 20 also adopts the breech lock system. Hence, it is possible to reduce rattling that may be caused by the use of the adapter 30B.

Application Examples

In the following, description is given on application examples of the camera 1.

First Application Example

The camera 1 may be used, with an adapter 30E mounted on the body-side mount 20, for example, as illustrated in FIG. 16, and furthermore, with a lens 2E mounted on the adapter 30E, as illustrated in FIG. 17. The adapter 30E may be an adapter for a cinematographic lens. The lens 2E may be a cinematographic lens. Furthermore, a view finder, a recorder, a battery, or other accessories and components (neither illustrated) may be also mounted on the body 10.

The adapter 30E may convert the body-side mount 20 of the camera 1 to a PL mount that is a standard mount in film industry, and may include a group of adapter-side contacts 38 as a group of contacts for the PL mount. The group of adapter-side contacts 38 may be disposed on the upper side and on the right side in the circumferential direction of the body-side mount 20, as seen from front of the body-side mount 20. The first group of contacts 41 may be coupled to the group of adapter-side contacts 38 through wirings or other components inserted through inside the adapter 30. The adapter 30E and the lens 2E may have flange back distances longer than the flange back distance FB20 unique to the body 10 and the body-side mount 20.

Second Application Example

Alternatively, the camera 1 may be used, with the adapter 30B mounted on the body-side mount 20, as illustrated in FIG. 11 or 15, and furthermore, with the lens 2B mounted on the adapter 30B, as illustrated in FIG. 18. The adapter 30B may be an adapter according to the first embodiment or the second embodiment. The lens 2B may be, for example, a still image photographing lens for a mirrorless camera, and may have the flange back distance FB51B (refer to FIG. 3) shorter than the flange back distance FB51B of the lens-side mount 51A. It is to be noted that the lens 2B may be a lens for a single lens reflex camera or a lens that may perform photographing of both still images and moving images. Thus, the use of the adapter 30B according to the example embodiments of the disclosure makes it possible for a user of the lens 2E that has been used in video industry to light-heartedly use the lens 2B that has been used in photograph industry. This allows for lowering barriers between application categories such as cinematography, broadcasting, and still image photographing for consumers. Hence, it is possible for a user to easily acquire opportunities of new experiences, and to expand possibility of video expression.

Modification Examples 1 to 4

It is to be noted that, in the forgoing example embodiments, description is given on a case in which, as seen from front of the body-side mount 20, the first group of contacts 41 is disposed on the left side, while the second group of contacts 42 is disposed on the lower side, in the circumferential direction around the optical axis A. However, the arrangement of the first group of contacts 41 and the second group of contacts 42 is not limited to the example as in the forgoing example embodiments, and various modifications may be possible as in the following modification examples 1 to 4. It is to be appreciated that modification examples of the arrangement of the first group of contacts 41 and the second group of contacts 42 are not limited to the following modification examples 1 to 4.

Modification Example 1

For example, referring to FIG. 19, as seen from front of the body-side mount 20, the first group of contacts 41 may be disposed on the upper side and on the right side, while the second group of contacts 42 may be disposed on the upper side, in the circumferential direction around the optical axis A.

Modification Example 2

Alternatively, for example, referring to FIG. 20, as seen from front of the body-side mount 20, the first group of contacts 41 may be disposed on the upper side and on the right side, while the second group of contacts 42 may be disposed on the left side, in the circumferential direction around the optical axis A.

Modification Example 3

In another alternative, for example, referring to FIG. 21, as seen from front of the body-side mount 20, the first group of contacts 41 may be disposed on the upper side and on the right side, while the second group of contacts 42 may be disposed on the obliquely lower left side, in the circumferential direction around the optical axis A.

Modification Example 4

In addition, for example, referring to FIG. 22, as seen from front of the body-side mount 20, the first group of contacts 41 may be disposed on the left side, while the second group of contacts 42 may be disposed on the upper side, in the circumferential direction around the optical axis A.

Modification Examples 5 and 6

Moreover, in the forgoing example embodiments and the modification examples 1 to 4, description is given on an exemplary case in which the two or more kinds of groups of contacts 40 include two kinds of groups of contacts: the first group of contacts 41 and the second group of contacts 42. However, three or four kinds of groups of contacts 40 may be provided, as described below in modification examples 5 and 6. Alternatively, five or more kinds of groups of contacts 40 may be provided.

Modification Example 5

FIG. 23 illustrates a configuration of the front surface of the body 10 according to the modification example 5. In the modification example, the two or more kinds of groups of contacts 40 are provided on the body 10. The two or more kinds of groups of contacts 40 may include a third group of contacts 43, in addition to the first group of contacts 41 and the second group of contacts 42 as described. The third group of contacts 43 may be disposed, for example, on the upper side, in the circumferential direction around the optical axis A. In other words, the third group of contacts 43 may be disposed in a circular-arc-shaped arrangement along an upper long side of the optical component 13. Also, the third group of contacts 43 may be disposed concentrically with the second group of contacts 42, in the radial direction with respect to the optical axis A. It is to be noted that the arrangement of the third group of contacts 43 is not limited to an example illustrated in FIG. 23.

Modification Example 6

FIG. 24 illustrates a configuration of the front surface of the body 10 according to the modification example 6. In the modification example, the two or more kinds of groups of contacts 40 are provided on the body 10. The two or more kinds of groups of contacts 40 may include a fourth group of contacts 44, in addition to the first group of contacts 41, the second group of contacts 42, and the third group of contacts 43 as described. The fourth group of contacts 44 may be disposed, for example, on the right side, in the circumferential direction around the optical axis A. In other words, the fourth group of contacts 44 may be disposed in a circular-arc-shaped arrangement along a right short side of the optical component 13. The fourth group of contacts 44 may be disposed concentrically with the second group of contacts 42 and the third group of contacts 43, in the radial direction with respect to the optical axis A. Alternatively, the fourth group of contacts 44 may be disposed at a different position from those of the second group of contacts 42 and the third group of contacts 43, in the radial direction with respect to the optical axis A. It is to be noted that the arrangement of the fourth group of contacts 44 is not limited to an example illustrated in FIG. 24.

Although description has been made by giving the example embodiments as mentioned above, the contents of the disclosure are not limited to the above-mentioned example embodiments and may be modified in a variety of ways. For example, shapes, dimensions, materials, or other properties of the components as described in the forgoing example embodiments are not limited to as exemplified above, but other shapes, dimensions, and materials may be adopted.

Moreover, for example, in the forgoing example embodiments, description has been given on specific configurations of the camera 1 and the adapter 30B. However, the camera 1 and the adapter 30B are not limited to those that include all the components as described. Also, the camera 1 and the adapter 30B may further include another component or other components.

It is to be noted that effects described herein are merely exemplified and not limitative, and effects of the disclosure may be other effects or may further include other effects. The contents of the technology may have the following configurations.

(1) A camera, including:
a body; and
two or more kinds of groups of contacts provided on the body and configured to be coupled to respective two or more kinds of lenses that include different lens-side mounts.

(2) The camera according to (1),
wherein the two or more kinds of groups of contacts are disposed at different positions in a radial direction with respect to an optical axis.

(3) The camera according to (1) or (2),
wherein the two or more kinds of groups of contacts are disposed at different positions in a direction of an optical axis.

(4) The camera according to any one of (1) to (3),
wherein the two or more kinds of groups of contacts are configured to be coupled to the respective two or more kinds of lenses that include the lens-side mounts different in shapes with which mechanical fitting into the body is made.

(5) The camera according to (4),
wherein the two or more kinds of groups of contacts are configured to be coupled to the respective two or more kinds of lenses that include the lens-side mounts different in diameters of apertures where the fitting is made.

(6) The camera according to any one of (1) to (5),
wherein the two or more kinds of groups of contacts are configured to be coupled to the respective two or more kinds of lenses that include the lens-side mounts different in flange back distances.

(7) The camera according to (6),
wherein one kind of the two or more kinds of groups of contacts is configured to be coupled to a lens that includes a lens-side mount adapted for a PL mount.

(8) The camera according to (6) or (7),
wherein one kind of the two or more kinds of groups of contacts is configured to be coupled to a lens that includes a lens-side mount adapted for a body-side mount having a flange back distance of 52 mm.

(9) The camera according to any one of (6) to (8),
wherein two kinds of the two or more kinds of groups of contacts are configured to be coupled to respective two kinds of lenses that include lens-side mounts different in flange back distances,
and a difference in the flange back differences of the respective two kinds of lenses is equal to or smaller than 12 mm.

(10) The camera according to any one of (1) to (9),
wherein the two or more kinds of groups of contacts are disposed at circumferentially-shifted positions around an optical axis.

(11) The camera according to (10),
wherein the two or more kinds of groups of contacts include a first group of contacts and a second group of contacts, and
the first group of contacts is disposed on upper side and on right side in a circumferential direction around the optical axis, while the second group of contacts is disposed on the upper side in the circumferential direction around the optical axis.

(12) The camera according to (10),
wherein the two or more kinds of groups of contacts include a first group of contacts and a second group of contacts, and
the first group of contacts is disposed on upper side and on right side in a circumferential direction around the optical axis, while the second group of contacts is disposed on lower side in the circumferential direction around the optical axis.

(13) The camera according to (10),
wherein the two or more kinds of groups of contacts include a first group of contacts and a second group of contacts, and
the first group of contacts is disposed on left side in a circumferential direction around the optical axis, while the second group of contacts is disposed on lower side in the circumferential direction around the optical axis.

(14) The camera according to (10),
wherein the two or more kinds of groups of contacts include a first group of contacts and a second group of contacts, and
the first group of contacts is disposed on left side in a circumferential direction around the optical axis, while the second group of contacts is disposed on upper side in the circumferential direction around the optical axis.

(15) The camera according to any one of (1) to (14),
wherein the body includes a body-side mount on a surface of the body, and
the two or more kinds of groups of contacts are provided on the same surface on which the body-side mount is provided.

(16) The camera according to any one of (1) to (15),
wherein the two or more kinds of groups of contacts are coupled, inside the body, to different grounds, different power supplies, and different wirings.

(17) The camera according to any one of (1) to (15),
wherein the two or more kinds of groups of contacts share, inside the body, at least one of a ground, a power supply, and a wiring.

(18) An adapter configured to be mounted on a camera, the camera including:
a body; and
two or more kinds of groups of contacts provided on the body and configured to be coupled to respective two or more kinds of lenses that include different lens-side mounts.

(19) The adapter according to (18), the adapter including an aperture on inner circumferential side,
wherein the adapter allows at least one kind of the two or more kinds of groups of contacts to be exposed in the aperture when the adapter is mounted on the camera.

This application claims the benefit of Japanese Priority Patent Application JP 2014-15450 filed on Jan. 30, 2014 the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A camera, comprising:
a body; and
a plurality of groups of contacts on the body, wherein
the plurality of groups of contacts comprises a first group of contacts and a second group of contacts different from the first group of contacts,
the plurality of groups of contacts is configured to be coupled to a plurality of lenses,
the plurality of lenses includes a plurality of lens-side mounts, and
a first length of each of the first group of contacts in a direction of an optical axis of the camera is different from a second length of each of the second group of contacts in the direction of the optical axis of the camera,
the difference between the first length and the second length is based on a difference between flange back distances of respective lens-side mounts of a first lens of the plurality of lenses and a second lens of the plurality of lenses, the flange back distances are with respect to an imaging plane, and
the first group of contacts having the first length is configured to couple with the first lens and the second group of contacts having the second length is configured to couple with the second lens.

2. The camera according to claim 1, wherein
the first group of contacts is at a first position in a radial direction with respect to the optical axis,
the second group of contacts is at a second position in the radial direction with respect to the optical axis, and the second position is different from the first position in the radial direction.

3. The camera according to claim 1, wherein
the plurality of lens-side mounts is to be mechanically fitted into the body, and
a shape of a first lens-side mount of the plurality of lens-side mounts is different from a shape of a second lens-side mount of the plurality of the lens-side mounts.

4. The camera according to claim 3, wherein a diameter of an aperture of the first lens-side mount is different from a diameter of an aperture of the second lens-side mount.

5. The camera according to claim 1, wherein a flange back distance of a first lens-side mount of the plurality of lens-side mounts is different from a flange back distance of a second lens-side mount of the plurality of lens-side mounts.

6. The camera according to claim 5, wherein the plurality of lens-side mounts includes a third lens-side mount adapted for a PL mount.

7. The camera according to claim 5, wherein the plurality of lens-side mounts includes a third lens-side mount adapted for a body-side mount, and a flange back distance of the body-side mount is 52 mm.

8. The camera according to claim 5, wherein the difference between the flange back distance of the first lens-side mount and the flange back distance of the second lens-side mount is equal to or smaller than 12 mm.

9. The camera according to claim 1, wherein the first group of contacts and the second group of contacts are at circumferentially-shifted positions around the optical axis in a radial direction.

10. The camera according to claim 9, wherein
a first number of contacts of the first group of contacts is on an upper side in a circumferential direction around the optical axis,
a second number of contacts of the first group of contacts is on a right side in the circumferential direction around the optical axis, and
the second group of contacts is on the upper side in the circumferential direction around the optical axis.

11. The camera according to claim 9, wherein
a first number of contacts of the first group of contacts is on an upper side in a circumferential direction around the optical axis,
a second number of contacts of the first group of contacts is on a right side in the circumferential direction around the optical axis, and
the second group of contacts is on a lower side in the circumferential direction around the optical axis.

12. The camera according to claim 9, wherein
the first group of contacts is on a left side in a circumferential direction around the optical axis, and
the second group of contacts is on a lower side in the circumferential direction around the optical axis.

13. The camera according to claim 9, wherein
the first group of contacts is on a left side in a circumferential direction around the optical axis, and
the second group of contacts is on an upper side in the circumferential direction around the optical axis.

14. The camera according to claim 1, wherein
the body includes a body-side mount on a surface of the body, and
the plurality of groups of contacts is on the same surface of the body.

15. The camera according to claim 1, wherein the first group of contacts and the second group of contacts are coupled, inside the body, to different grounds, different power supplies, and different wirings.

16. The camera according to claim 1, wherein the first group of contacts and the second group of contacts share, inside the body, at least one of a ground, a power supply, or a wiring.

* * * * *